(12) United States Patent
Deshpande et al.

(10) Patent No.: US 10,149,168 B2
(45) Date of Patent: Dec. 4, 2018

(54) SECURED PAGING

(71) Applicant: QUALCOMM Incorporated, San Diego, CA (US)

(72) Inventors: Yogesh Bhalchandra Deshpande, Ashford (GB); Mungal Singh Dhanda, Slough (GB); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/052,476

(22) Filed: Feb. 24, 2016

(65) Prior Publication Data
US 2017/0180995 A1 Jun. 22, 2017

Related U.S. Application Data

(60) Provisional application No. 62/268,115, filed on Dec. 16, 2015.

(51) Int. Cl.
H04W 12/10 (2009.01)
H04W 12/04 (2009.01)
(Continued)

(52) U.S. Cl.
CPC .......... *H04W 12/10* (2013.01); *H04L 9/0866* (2013.01); *H04L 63/0414* (2013.01);
(Continued)

(58) Field of Classification Search
CPC ..... H04W 68/00; H04W 12/02; H04W 12/06; H04W 12/04; H04W 68/005;
(Continued)

(56) References Cited

U.S. PATENT DOCUMENTS

2003/0061480 A1* 3/2003 Le .................. H04L 63/061
713/153
2003/0171125 A1* 9/2003 Oprescu-Surcobe ........
H04W 68/00
455/458

(Continued)

FOREIGN PATENT DOCUMENTS

EP 2479921 A1 7/2012

OTHER PUBLICATIONS

ISA/EP, International Search Report and Written Opinion of the International Searching Authority, Int'l Application No. PCT/US2016/063112, dated Feb. 21, 2017, European Patent Office, Rijswijk, NL, 13 pgs.

*Primary Examiner* — George Eng
*Assistant Examiner* — Umair Ahsan
(74) *Attorney, Agent, or Firm* — Holland & Hart LLP

(57) ABSTRACT

Methods, systems, and devices for wireless communication are described. A user equipment (UE) may receive a paging message that includes a secured UE identifier calculated based on a security configuration negotiated between the UE and a trusted source, e.g., a mobility management entity (MME) of the core network. The UE may determine whether the paging message is received from the trusted source or an untrusted source based on the secured UE identifier. The UE may transmit a connection request message based on the determination that the paging message is received from a trusted source.

34 Claims, 18 Drawing Sheets

(51) Int. Cl.
  *H04W 72/04*  (2009.01)
  *H04W 68/00*  (2009.01)
  *H04L 9/08*  (2006.01)
  *H04L 29/06*  (2006.01)
  *H04W 12/02*  (2009.01)
  *H04W 12/06*  (2009.01)
(52) U.S. Cl.
  CPC ........... *H04W 12/02* (2013.01); *H04W 12/04* (2013.01); *H04W 12/06* (2013.01); *H04W 68/00* (2013.01); *H04W 72/042* (2013.01); *H04W 68/005* (2013.01)
(58) Field of Classification Search
  CPC ............... H04W 68/02; H04L 2209/80; H04L 63/0414; H04L 9/0866; H04L 63/061; H04L 63/0876; H04L 63/123
  See application file for complete search history.

(56) References Cited

U.S. PATENT DOCUMENTS

| | | | | |
|---|---|---|---|---|
| 2012/0076085 A1* | 3/2012 | Chou | ................... | H04W 68/00 370/329 |
| 2012/0170745 A1* | 7/2012 | Bai | ..................... | H04L 9/0866 380/270 |
| 2014/0064486 A1* | 3/2014 | Abraham | ............. | H04W 12/04 380/270 |
| 2015/0079941 A1* | 3/2015 | Arkko | .................. | H04L 63/123 455/411 |

* cited by examiner

SECURED PAGING

CROSS REFERENCES

The present application for patent claims priority to U.S. Provisional Patent Application No. 62/268,115 by Deshpande et al., entitled "Secured Paging," filed Dec. 16, 2015, assigned to the assignee hereof.

BACKGROUND

The following relates generally to wireless communication, and more specifically to secured paging.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless communications systems may support an as-needed connection between the UE and a base station. For example, a UE may initially connect to a base station upon entering a coverage area and then transition to an idle mode with no active connection until there is information to communicate. When the network (e.g., a mobility management entity (MME) of the core network) has information to communicate to the UE, a paging message is transmitted to the UE via the base station. The UE responds to the paging message by transmitting a connection request to establish an active connection to receive the information.

Conventional paging procedures, however, may not provide adequate security measures for the UE. The paging messages transmitted over the medium to the UE may include the UE's identity, e.g., an international mobile subscriber identity (IMSI), for routing purposes, for example. The UE receives the paging message, confirms the UE's identity is correct, and responds by transmitting the connection request message. A malicious attacker, however, may intercept the paging message transmission and decode the UE's identity, and use this information to transmit multiple paging messages to the UE. As the false paging messages include the correct UE identity, the UE may respond by transmitting multiple connection request message. This may congest the medium for the UE and base station as well as waste vital resources, e.g., deplete battery power, of the UE.

SUMMARY

The described features generally relate to improved methods, systems, devices, and/or apparatuses that support secured paging. Broadly, the described techniques provide for sending the paging message to a UE in a secured manner where the UE can confirm that the paging message is from a trusted source before responding with a connection request message. For example, the UE may receive a paging message that includes a secured UE identifier that is calculated based on a security configuration negotiated between the UE and the trusted source. The UE may use the secured UE identifier to confirm that the paging message is received from the trusted source and, if so, respond by transmitting a connection request message to establish a connection. When the UE determines the paging message is not received from a trusted source, the UE may ignore the paging message.

A method of wireless communication is described. The method may include receiving, at a UE, a first paging message comprising a secured UE identifier calculated based at least in part on a security configuration negotiated between the UE and a trusted source, determining whether the first paging message is received from the trusted source or an untrusted source based at least in part on the secured UE identifier and transmitting a connection request message based at least in part on the determination that the first paging message is received from a trusted source.

An apparatus for wireless communication is described. The apparatus may include means for receiving, at a UE, a first paging message comprising a secured UE identifier calculated based at least in part on a security configuration negotiated between the UE and a trusted source, means for determining whether the first paging message is received from the trusted source or an untrusted source based at least in part on the secured UE identifier and means for transmitting a connection request message based at least in part on the determination that the first paging message is received from a trusted source.

A further apparatus is described. The apparatus may include a processor, memory in electronic communication with the processor, and instructions stored in the memory. The instructions may be operable to cause the processor to receive, at a UE, a first paging message comprising a secured UE identifier calculated based at least in part on a security configuration negotiated between the UE and a trusted source, determine whether the first paging message is received from the trusted source or an untrusted source based at least in part on the secured UE identifier and transmit a connection request message based at least in part on the determination that the first paging message is received from a trusted source.

A non-transitory computer readable medium for wireless communication is described. The non-transitory computer-readable medium may include instructions to cause a processor to receive, at a UE, a first paging message comprising a secured UE identifier calculated based on a security configuration negotiated between the UE and a trusted source, determine whether the first paging message is received from the trusted source or an untrusted source based on the secured UE identifier and transmit a connection request message based on the determination that the first paging message is received from a trusted source.

Some examples of the method, apparatus, or non-transitory computer-readable medium described above may further include processes, features, means, or instructions for refraining from transmitting the connection request message based on a determination that the first paging message is received from the untrusted source.

In some examples of the method, apparatus, or non-transitory computer-readable medium described above, the determining the first paging message is received from the trusted source comprises: determining that the first paging message includes the secured UE identifier.

Some examples of the method, apparatus, or non-transitory computer-readable medium described above may further include processes, features, means, or instructions for calculating one or more expected secured UE identifiers based on the security configuration. Some examples of the method, apparatus, or non-transitory computer-readable medium described above may further include processes, features, means, or instructions for determining that the first paging message includes the secured UE identifier that matches at least one of the one or more expected secured UE identifiers.

In some examples of the method, apparatus, or non-transitory computer-readable medium described above, the security configuration comprises a security key. In some examples of the method, apparatus, or non-transitory computer-readable medium described above, the security key comprises a key access security management entity (Kasme).

In some examples of the method, apparatus, or non-transitory computer-readable medium described above, the security configuration comprises a sequence number. In some examples of the method, apparatus, or non-transitory computer-readable medium described above, the secured UE identifier comprises at least a portion of the sequence number.

In some examples of the method, apparatus, or non-transitory computer-readable medium described above, the sequence number comprises at least a portion of a downlink (DL) non-access stratum (NAS) count value. In some examples of the method, apparatus, or non-transitory computer-readable medium described above, the determining the first paging message is received from the trusted source comprises: determining a UE sequence number for the first paging message. Some examples of the method, apparatus, or non-transitory computer-readable medium described above may further include processes, features, means, or instructions for determining that the UE sequence number has not been previously used.

Some examples of the method, apparatus, or non-transitory computer-readable medium described above may further include processes, features, means, or instructions for refraining from transmitting the connection request message based on a determination that the UE sequence number has been previously used.

Some examples of the method, apparatus, or non-transitory computer-readable medium described above may further include processes, features, means, or instructions for transmitting a support indicator to the trusted source, the support indicator providing an indication that the UE supports the use of the secured UE identifier in a paging procedure.

Some examples of the method, apparatus, or non-transitory computer-readable medium described above may further include processes, features, means, or instructions for receiving, from the trusted source, a confirmation that the trusted source supports the use of the secured UE identifier in the paging procedure. In some examples of the method, apparatus, or non-transitory computer-readable medium described above, the confirmation comprises a format indicator associated with the secured UE identifier.

A method of wireless communication is described. The method may include determining a secured UE identifier calculated based on a security configuration negotiated between the UE and a trusted source, transmitting a first paging message to the UE, the first paging message comprising the secured UE identifier and establishing a connection with the UE.

An apparatus for wireless communication is described. The apparatus may include means for determining a secured UE identifier calculated based on a security configuration negotiated between the UE and a trusted source, means for transmitting a first paging message to the UE, the first paging message comprising the secured UE identifier and means for establishing a connection with the UE.

A further apparatus is described. The apparatus may include a processor, memory in electronic communication with the processor, and instructions stored in the memory. The instructions may be operable to cause the processor to determine a secured UE identifier calculated based on a security configuration negotiated between the UE and a trusted source, transmit a first paging message to the UE, the first paging message comprising the secured UE identifier and establish a connection with the UE.

A non-transitory computer readable medium for wireless communication is described. The non-transitory computer-readable medium may include instructions to cause a processor to determine a secured UE identifier calculated based on a security configuration negotiated between the UE and a trusted source, transmit a first paging message to the UE, the first paging message comprising the secured UE identifier and establish a connection with the UE.

In some examples of the method, apparatus, or non-transitory computer-readable medium described above, the security configuration comprises a security key. In some examples of the method, apparatus, or non-transitory computer-readable medium described above, the security key comprises a key access security management entity (Kasme).

In some examples of the method, apparatus, or non-transitory computer-readable medium described above, the security configuration comprises a sequence number. In some examples of the method, apparatus, or non-transitory computer-readable medium described above, the secured UE identifier comprises at least a portion of the sequence number.

In some examples of the method, apparatus, or non-transitory computer-readable medium described above, the sequence number is based on a DL non-access stratum (NAS) count value. Some examples of the method, apparatus, or non-transitory computer-readable medium described above may further include processes, features, means, or instructions for receiving a support indicator from the UE, the support indicator providing an indication that the UE supports the use of the secured UE identifier in a paging procedure.

Some examples of the method, apparatus, or non-transitory computer-readable medium described above may further include processes, features, means, or instructions for transmitting, to the UE, a confirmation that the trusted source supports the use of the secured UE identifier in the paging procedure.

In some examples of the method, apparatus, or non-transitory computer-readable medium described above, the confirmation comprises a format indicator associated with the secured UE identifier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Conventional paging procedures are unsecured and include the user equipment (UE) identity in the paging message. This exposes the UE identity to interception and use by a malicious attacker. The attacker may read the UE identity from the paging message and use this to send repeated paging messages to the UE. The UE, unaware that the paging message is from an attacker, confirms the UE identity is correct and responds with a connection request message. Each false paging message and resultant connection request message consumes over-the-air resources of the network and causes added power usage at the UE. This impact may be more pronounced in UEs with limited battery power and/or that are unable to be recharged, e.g., machine-type devices, wearable internet connected devices, etc., that are designed to operate for extended periods of time without a replacement battery.

Aspects of the disclosure are initially described in the context of a wireless communication system. Broadly, a secured paging procedure is described that uses a secured UE identifier that is calculated by a network entity and the UE to confirm that the paging message is from a trusted source. Once the UE calculates and confirms the secured UE identifier, a connection request message is transmitted. The UE may initially indicate that it supports secured paging in an attach request, location area update request message, etc., and negotiate a security configuration between the UE and the trusted source (e.g., a mobility management entity (MME) of a core network). The secured UE identifier may be based on the security configuration and may include a secured identifier associated with the UE and/or a sequence number. Aspects of the secured UE identifier may be calculated based on a security context between the UE and the trusted source. Aspects of the disclosure are further illustrated by and described with reference to apparatus diagrams, system diagrams, and flowcharts that relate to secured paging.

Figure 1:
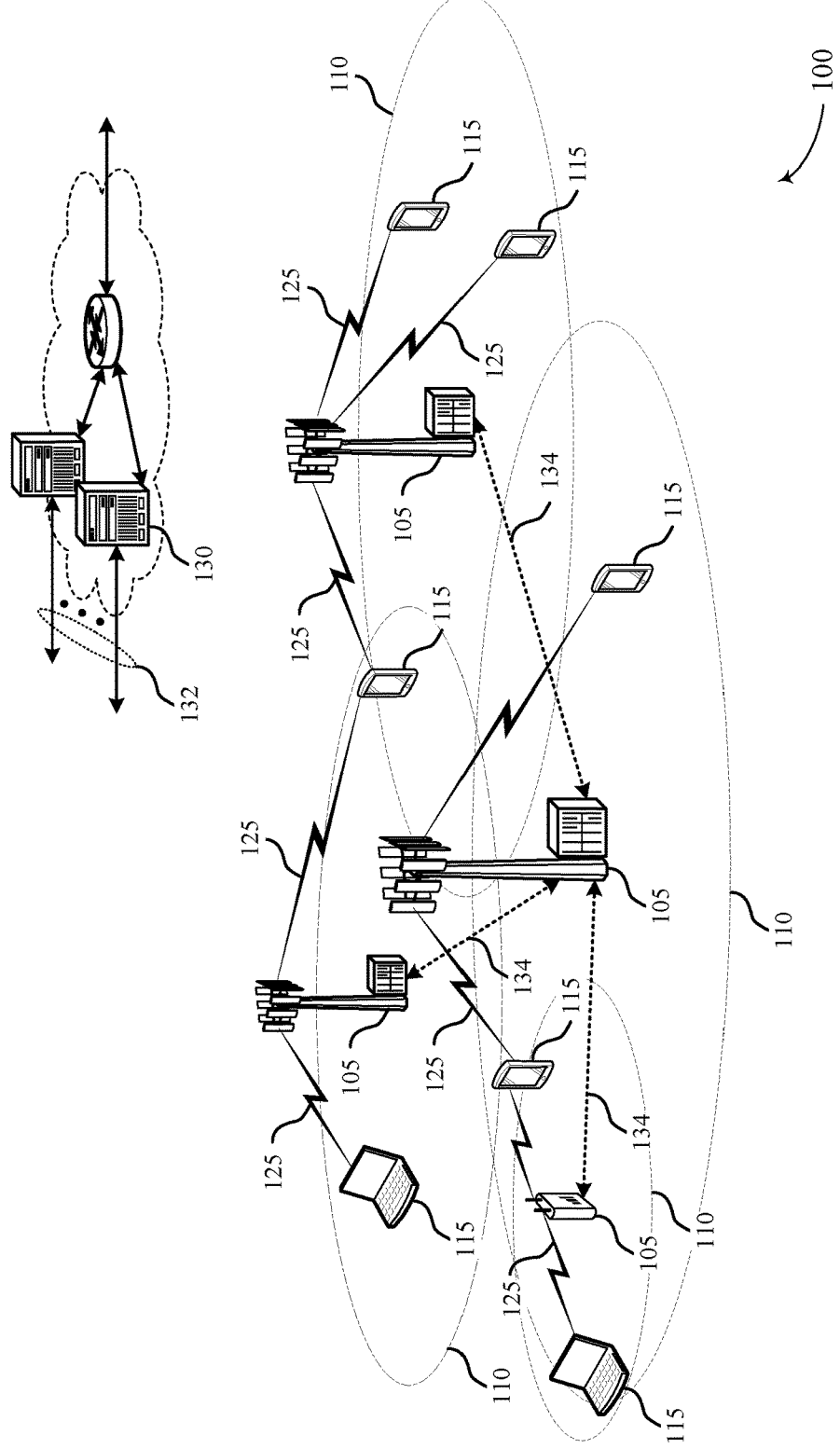
FIG. 1 illustrates an example of a wireless communications system that supports secured paging in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 supports secured paging procedures where the UE 115 receives a paging message with a secured UE identifier, uses the secured UE identifier to confirm the paging message is from a trusted source, and transmits a connection request message if the paging message is from a trusted source.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a wearable device, a handset, a user agent, a client, or like terminology. A UE 115 may also be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one PDN gateway (P-GW). The MME may be the control node that processes the signaling between the UE 115 and the EPC. The MME may manage mobility for UEs 115 and may be responsible for initiating paging and authentication of the UEs 115. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

A UE 115 generally connects to a base station 105 upon entering the coverage area 110 of the base station 105, e.g., upon initially powering on, when moving between coverage areas 110, etc. The UE 115 attaches and negotiates a security configuration with the MME. The MME may be considered a trusted source from the UE perspective, as compared to a malicious attacker (e.g., untrusted source) that sends false paging messages. During the negotiations, the UE the trusted source may negotiate the security configuration that includes a secured UE identifier. The secured UE identifier may be based, in some aspects, on a security context shared between the UE 115 and the MME. The UE 115 may enter an idle mode and periodically wake up to receive paging messages. If the S-GW receives data for the UE 115, it may notify the MME, which may send a paging message to every base station 105 within an area known as a tracking area for transmission to the UE 115. The paging message may include the secured UE identifier that is calculated between the UE 115 and the MME. Each base station 105 within the tracking area may send the paging message with the secured UE identifier.

The UE 115 receives the paging message that includes the secure UE identifier. The UE 115 may, in some cases, have pre-calculated an expected secured UE identifier based on the security configuration. As the UE 115 and the MME negotiated the security configuration, the secured UE identifier from the MME will match the expected secured UE identifier calculated by the UE 115. Thus, the UE 115 may confirm that the expected secured UE identifier matches the secured UE identifier included in the paging message. This confirmation may provide a determination for the UE 115 that the paging message is from a trusted source (e.g., the MME). The UE 115 may then transmit a connection request message.

Figure 2:
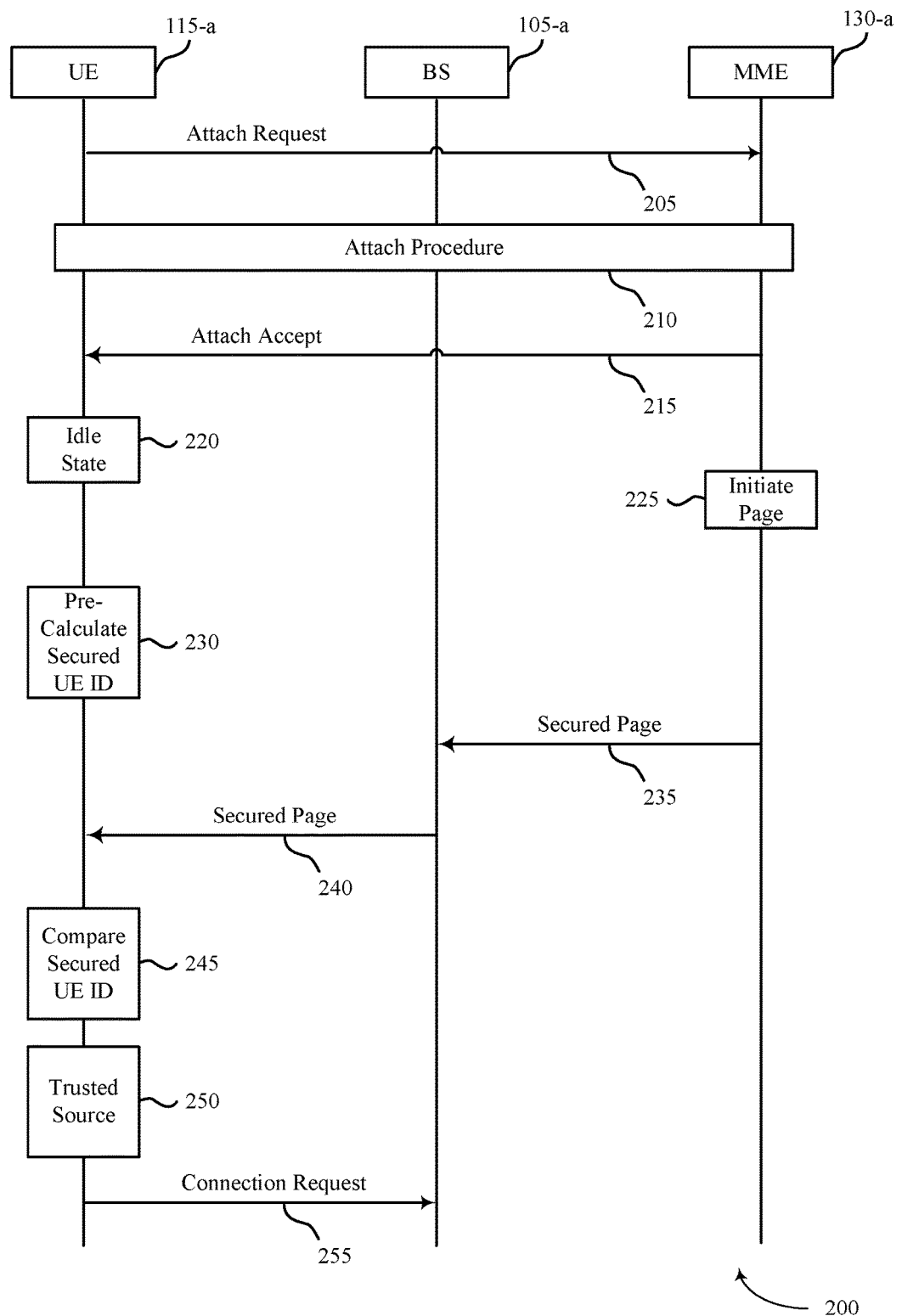
FIG. 2 through 4 illustrate examples of process flows in a system that supports secured paging in accordance with aspects of the present disclosure.

FIG. 2 illustrates an example of a process flow 200 for secured paging in accordance with various aspects of the present disclosure. Process flow 200 may include base station 105-a, a UE 115-a, and a MME 130-a, which may be examples of the corresponding devices described with reference to FIG. 1. Process flow 200 may implement aspects of wireless communications system 100 of FIG. 1.

At 205, UE 115-a may transmit an attach request message to the MME 130-a. The attach request message may be transmitted via base station 105-a. The attach request message may be transmitted upon the UE 115-a being initially powered on, traversing into a coverage area of the base station 105-a, etc. In response and at 210, the UE 115-a and the MME 130-a may perform an attach procedure where the UE 115-a connects to the network (e.g., MME 130-a), is authenticated, etc. Once the attach procedure is complete and at 215, the MME 130-a may transmit an attach acceptance message to the UE 115-a.

The UE 115-a and the MME 130-a may negotiate a security configuration during the attach procedure. Broadly, the negotiation to establish the security configuration may provide for NAS layer security (e.g., ciphering and integrity protection) to be completed prior to paging. This may ensure that the UE 115-a and the MME 130-a each share the same security context, e.g., key access security management entity ($K_{asme}$) which may be associated with a security key shared by the UE 115-a and the MME 130-a. Additionally, the UE 115-a and MME 130-a may support the negotiation of the use of the secured paging procedures. For example, the UE 115-a may provide an indication in attach request message (e.g., first UL non access stratum (NAS) message) that it supports secured paging procedures. The MME 130-a may respond with a confirmation that it supports secured paging, e.g., in the attach accept message.

The secured UE identifier may be based on the negotiated security configuration. The secured UE identifier may include a secured paging identity for the UE 115-a. In some cases, the secured UE identifier may also include a sequence number that is x bits long. Each of the UE 115-a and the MME 130-a may maintain a DL NAS counter that uses a 24 bit internal representation. The sequence number may be based on the DL NAS counter value, e.g., at least a portion of the bits of the DL NAS Count value. The value of x (e.g., the number of bits in the sequence number) may be negotiated between the UE 115-a and the MME 130-a. As the DL NAS counter value is incremented at each DL transmission to the UE 115-a, the sequence number will also change for each incremented DL NAS count value. Moreover, as the DL NAS counter value increments, the sequence number included in the secured UE identifier may not be reused for the UE 115-a. The UE 115-a may use DL NAS count counter variable in combination with the security key as an input to precalculate an expected secured UE identifier and to decipher the secured UE identifier received in the paging message. The NAS count value may be constructed using an x-bit sequence number (e.g., the x least significant bits), that is concatenated with a NAS overflow counter. Although the described negotiation is provide during an attach procedure in FIG. 2, it is to be understood that the UE 115-a and the MME 130-a may negotiate the security configuration during other procedures, e.g., a tracking area update message, etc.

The exact format for the secured UE identifier may be based on the processing load for the UE 115-a, the risk of de-synchronization between the UE 115-a and the MME 130-a, an amount of privacy desired, etc. In some cases, an example secured UE identifier format may include one or more of the following: x least significant bits of the DL NAS counter value; the secured UE identity (e.g., an identity that is hidden) that may be a function of $K_{asme}$, a secured temporary mobile subscriber identifier (S-TMSI), 24-y most significant bits of the DL NAS counter value (e.g., when y is equal to 24, the secured UE identity may be constant, when y is zero, the media access control (MAC) may be excluded); and the MAC of the paging message, which may be a function of $K_{asme}$, S-TMSI, DL NAS counter value, etc.

In one non-limiting example, a secured UE identifier may have a format of: x=y=4, where the length of the secured UE identity is 20 bits, and the length of the MAC element is 16 bits. This example format may leverage a current paging length to provide the described secured paging procedures. This may provide for the same secured UE identity to be used, e.g., 16 times for paging and provide for a low chance of a random collision forcing the UE 115-a to perform additional processing. Also, the example format may provide for a small chance (e.g, 1 in 65,536) of forging a paging message to the UE 115-a.

At 220, the UE 115-a may enter an idle mode where it does not have an active connection. The UE 115-a may periodically wake up and monitor the medium to receive paging messages, for example. At 225 the MME 130-a may determine that has information to communicate to the UE 115-a and therefore may initiate a paging procedure. At 230, the UE 115-a may precalculate an expected secured UE identifier. The pre-calculation may be performed using the security configuration described above, e.g., using the UE secured identifier format attributes described above. In some examples, the UE 115-a may calculate more than one expected secured UE identifier, e.g., two or more, when a least significant bit of the DL NAS count value is indicated for use in the sequence number. The UE 115-a may precalculate the expected secured UE identifier(s) prior to transitioning to the idle mode, in some examples.

At 235, the MME 130-a may transmit a secured paging message to the base station 105-a. The paging message may be addressed to UE 115-a and therefore at 240, the base station 105-a may transmit the paging message to the UE 115-a. The paging message may include the secured identifier based on the negotiated security configuration. The paging message may include a paging container that includes the secured UE identifier. The paging container may be an information string that includes a paging record list and an associated paging record.

A non-limiting example paging record list may include an entry such as:

"PagingRecordList::=SEQUENCE (SIZE (1..max-PageRec)) OF PagingRecord."

A non-limiting example paging record may also include an entry such as:

"PagingRecord::=SEQUENCE {SecuredPagingUE-Identity, ue_sequence_num BIT STRING (SIZE (x)), cn-Domain ENUMERATED {ps, cs},}."

The SecuredPagingUE-Identity may include the secured UE identity. The ue_sequence_num bit string may include a sequence number of size of x.

At 245, the UE 115-a may compare the secured UE identifier included in the paging message to the pre-calculated expected secured UE identifier. For example, the UE 115-a may compare the secured UE identifier to the expected secured UE identifier calculated based on the x-bit sequence number. If the comparison results in a match, at 250 the UE 115-a may determine that the paging message is received from a trusted source. Accordingly and at 255, the UE 115-a may transmit a connection request message to the base station 105-a to establish an active connection to be used to communicate information.

Figure 3:
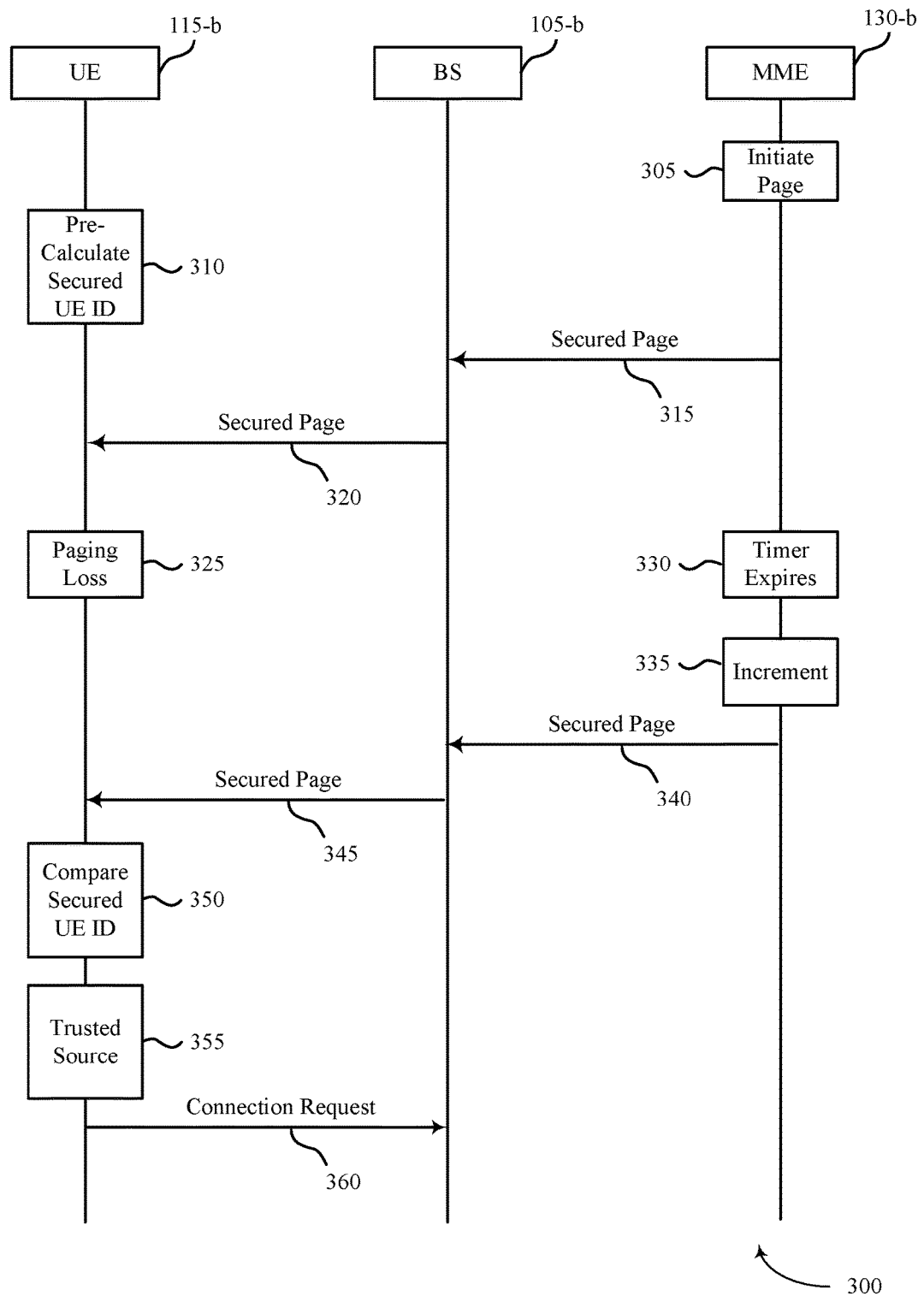

FIG. 3 illustrates an example of a process flow 300 for secured paging in accordance with various aspects of the present disclosure. Process flow 300 may include base station 105-b, a UE 115-b, and a MME 130-b, which may be examples of the corresponding devices described with reference to FIGS. 1 and/or 2. Process flow 300 may implement aspects of wireless communications system 100 of FIG. 1. Generally, process flow 300 illustrates an example of secured paging in the situation where a paging loss due to poor radio conditions, for example, is experienced. In the description regarding process flow 300, the UE 115-b and the MME 130-b may have already negotiated the security configuration used to calculate the secured UE identifier, e.g., during an attach procedure, in conjunction with a tracking area update procedure, etc.

At 305, the MME 130-b may determine that it has information to communicate to the UE 115-b, e.g., data to downlink to the UE 115-b, and therefore initiate the paging procedure. At 310, the UE 115-b may precalculate the expected secured UE identifier, as described with reference to process flow 200. It is to be understood that the UE 115-b may precalculate the expected secured UE identifier prior to step 305 and, for example, prior to entering an idle mode. At 315, the MME 130-b may transmit a paging message to the base station 105-b that is addressed to UE 115-b. At 320, the base station 105-b transmits the paging message to the UE 115-b. The paging message may include the secured UE identifier that is determined based on the pre-negotiated security configuration between the UE 115-b and the MME 130-b (e.g., a trusted source from the UE 115-b perspective). For example, the paging message may include the paging container that includes the paging record list and associated paging record. The format for the secured UE identifier may be selected in accordance with the description of process flow 200.

At 325, the UE 115-b may experience a paging loss. The paging loss may result in the paging message not being received at the UE 115-b and/or not being decodable by the UE 115-b. Therefore, from the UE 115-b perspective, the paging message may not have been received. At 330, the MME 130-b may determine that the UE 115-b has experienced the paging loss based on expiration of a timer. For example, the MME 130-b may initiate a timer (e.g., a T3413 timer) upon transmitting the paging message. When the timer has expired without receiving a connection being established with the UE 115-b, the MME 130-b may determine that the paging loss has occurred.

Therefore, at 335 the MME 130-b may increment the secured UE identifier. Incrementing the secured UE identifier may include incrementing the DL NAS counter value, e.g., based on the downlink paging message being transmitted to the UE 115-b. As the secured UE identifier may be based on the DL NAS counter value, in some examples, this may result in the secured UE identifier also being incremented. At 340, the MME 130-b may transmit a second paging message to the UE 115-b via the base station 105-b at 345. The second paging message may include the incremented secured UE identifier.

At 350, the UE 115-b may compare the secured UE identifier included in the paging message (e.g., the incremented secured UE identifier) to a pre-calculated expected secured UE identifier. For example, the UE 115-b may compare the secured UE identifier to the expected secured UE identifier calculated based on the x-bit sequence number. As previously discussed, the UE 115-b may have pre-calculated more than one expected secured UE identifiers. The UE 115-b may compare the received secured UE identifier to each of the expected secured UE identifiers to determine if there is a match.

In some aspects, the UE 115-b may determine whether the received secured UE identifier has been previously used, e.g., the sequence number has been previously used. If the secured UE identifier has been previously used, the UE 115-b may determine that the paging message has been received from an untrusted source, e.g., not from MME 130-b. If, however, the comparison results in a match, at 355 the UE 115-b may determine that the paging message is received from a trusted source. Accordingly and at 360, the UE 115-b may transmit a connection request message to the base station 105-b to establish an active connection to be used to communicate information.

Figure 4:
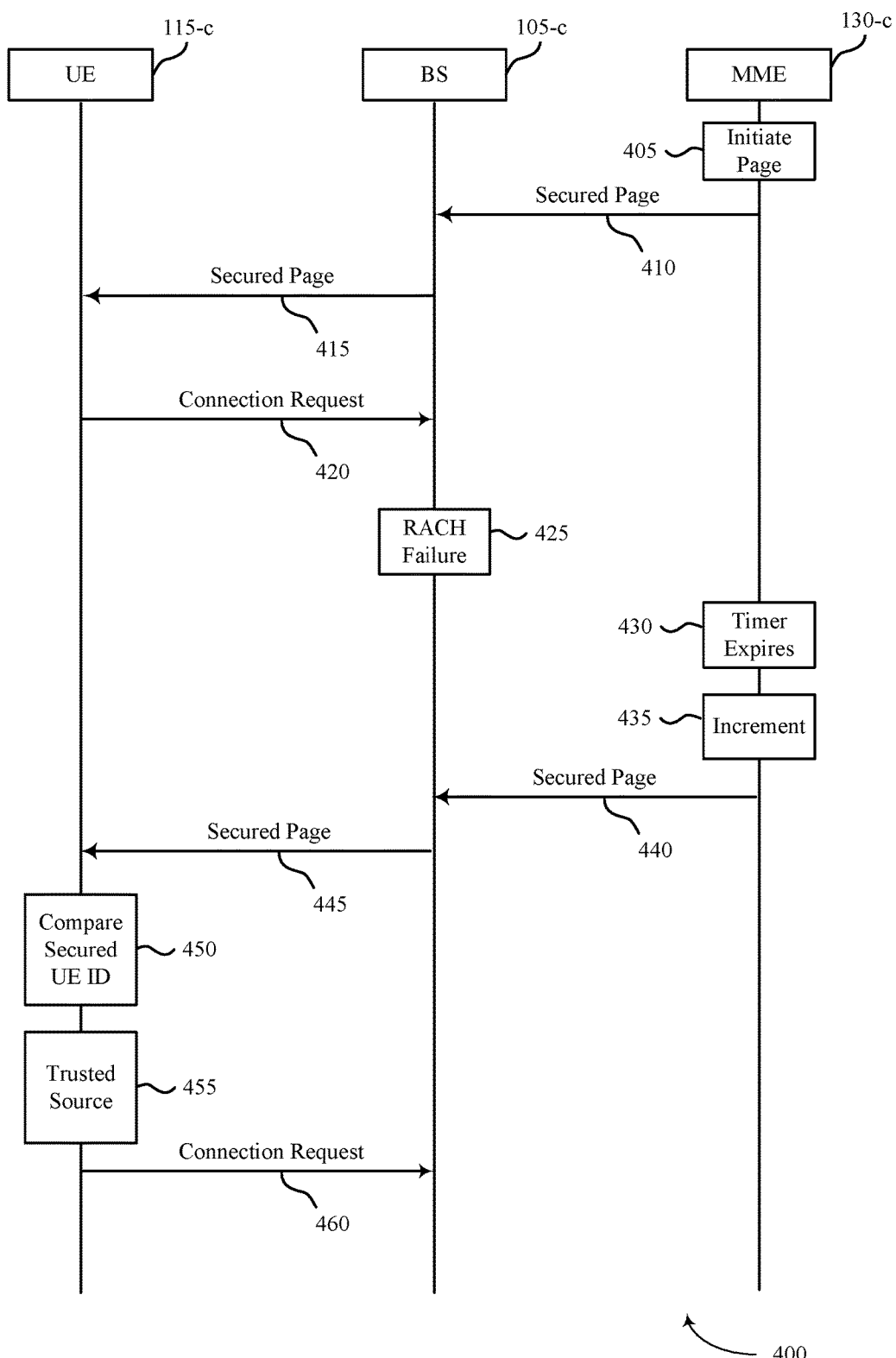

FIG. 4 illustrates an example of a process flow 400 for secured paging in accordance with various aspects of the present disclosure. Process flow 400 may include base station 105-c, a UE 115-c, and a MME 130-c, which may be examples of the corresponding devices described with reference to FIGS. 1, 2, and/or 3. Process flow 400 may implement aspects of wireless communications system 100 of FIG. 1. Generally, process flow 400 illustrates an example of secured paging in the situation where a random access channel (RACH) connection procedure fails between the UE 115-c and the base station 105-c. In the description regarding process flow 400, the UE 115-c and the MME 130-c may have already negotiated the security configuration used to calculate the secured UE identifier, e.g., during an attach procedure, in conjunction with a tracking area update procedure, etc.

At 405, the MME 130-c may determine that it has information to communicate to the UE 115-c, e.g., data to downlink to the UE 115-c, and therefore initiate the paging procedure. The UE 115-c may pre-calculated the expected secured UE identifier, as described with reference to process flows 200 and/or 300. At 410, the MME 130-c may transmit a paging message to the base station 105-c that is addressed to UE 115-c. At 415, the base station 105-c transmits the paging message to the UE 115-c. The paging message may include the secured UE identifier that is determined based on the pre-negotiated security configuration between the UE 115-c and the MME 130-c (e.g., a trusted source from the UE 115-c perspective). For example, the paging message may include the paging container that includes the paging record list and associated paging record. The format for the secured UE identifier may be selected in accordance with the description of process flow 200.

The UE 115-c may receive the paging message and respond at 420 by transmitting a connection request message to the base station 105-c. The connection request message may generally initiate an active connection between the UE 115-c and the base station 105-c, e.g., a radio resource control (RRC) connection. The connection request may include a RACH connection procedure and may fail due to poor radio conditions, interference, etc. Therefore, the RACH failure may result in the UE 115-c being unable to establish a connection to the base station 105-c and the MME 130-c to receive the downlink information.

At 430, the MME 130-c may determine that the UE 115-c has experienced the RACH failure based on expiration of a timer. For example, the MME 130-c may initiate a timer (e.g., a T3413 timer) upon transmitting the paging message. When the timer has expired without a connection being established with the UE 115-c, the MME 130-c may determine that the RACH failure has occurred.

Therefore, at 435 the MME 130-c may increment the secured UE identifier. Incrementing the secured UE identifier may include incrementing the DL NAS counter value, e.g., based on the downlink paging message being transmitted to the UE 115-c. As the secured UE identifier may be based on the DL NAS counter value, in some examples, this may result in the secured UE identifier also being changed. At 440, the MME 130-c may transmit a second paging message to the UE 115-c via the base station 105-c at 445. The second paging message may include the changed secured UE identifier.

At 450, the UE 115-c may compare the secured UE identifier included in the paging message (e.g., the changed secured UE identifier) to a pre-calculated expected secured UE identifier. For example, the UE 115-c may compare the secured UE identifier to the expected secured UE identifier calculated based on the x-bit sequence number. As previously discussed, the UE 115-c may have pre-calculated more than one expected secured UE identifiers. The UE 115-c may compare the received secured UE identifier to each of the expected secured UE identifiers to determine if there is a match.

In some aspects, the UE 115-c may determine whether the received secured UE identifier has been previously used, e.g., the sequence number has been previously used. If the secured UE identifier has been previously used, the UE 115-c may determine that the paging message has been received from an untrusted source, e.g., not from MIME 130-c. If, however, the comparison results in a match, at 455 the UE 115-c may determine that the paging message is received from a trusted source. Accordingly and at 460, the UE 115-c may transmit a connection request message to the base station 105-c to establish an active connection to be used to communicate information.

Figure 5:
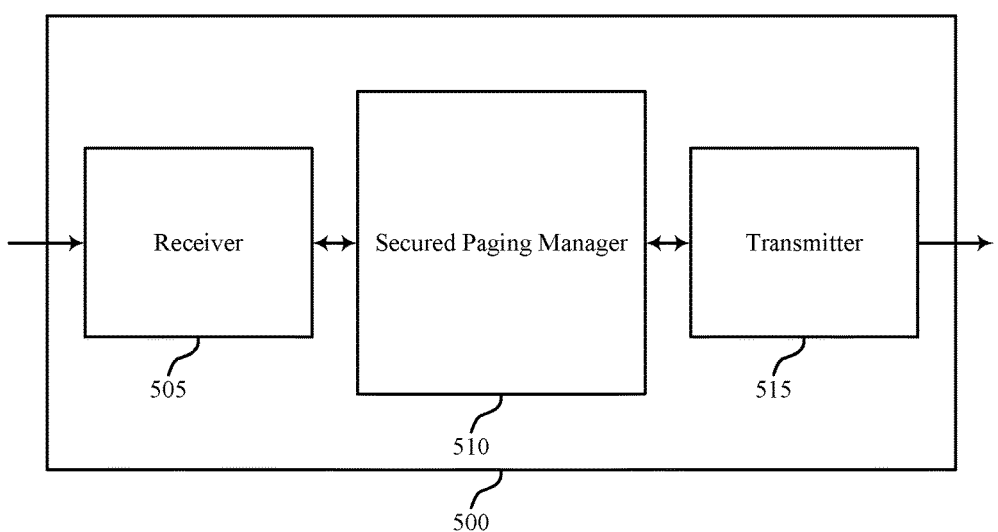
FIGS. 5 through 7 show block diagrams of a wireless device that supports secured paging in accordance with aspects of the present disclosure.

FIG. 5 shows a block diagram of a wireless device 500 that supports secured paging in accordance with various aspects of the present disclosure. Wireless device 500 may be an example of aspects of a UE 115 described with reference to FIGS. 1 through 4. Wireless device 500 may include receiver 505, secured paging manager 510, and transmitter 515. Wireless device 500 may also include a processor. Each of these components may be in communication with each other.

The receiver 505 may receive information such as packets, user data, or control information associated with various information channels (e.g., control channels, data channels, and information related to secured paging, etc.). Information may be passed on to other components of the device 500. The receiver 505 may be an example of aspects of the transceiver 825 described with reference to FIG. 8.

The secured paging manager 510 may receive, at the device 500 (e.g., a UE 115), a first paging message including a secured UE identifier calculated based on a security configuration negotiated between the UE 115 and a trusted source, determine whether the first paging message is received from the trusted source or an untrusted source based on the secured UE identifier, and transmit a connection request message based on the determination that the first paging message is received from a trusted source. The secured paging manager 510 may also be an example of aspects of the secured paging manager 805 described with reference to FIG. 8.

The transmitter 515 may transmit signals received from other components of wireless device 500. In some examples, the transmitter 515 may be collocated with a receiver in a transceiver. For example, the transmitter 515 may be an example of aspects of the transceiver 825 described with reference to FIG. 8. The transmitter 515 may include a single antenna, or it may include a plurality of antennas.

Figure 6:
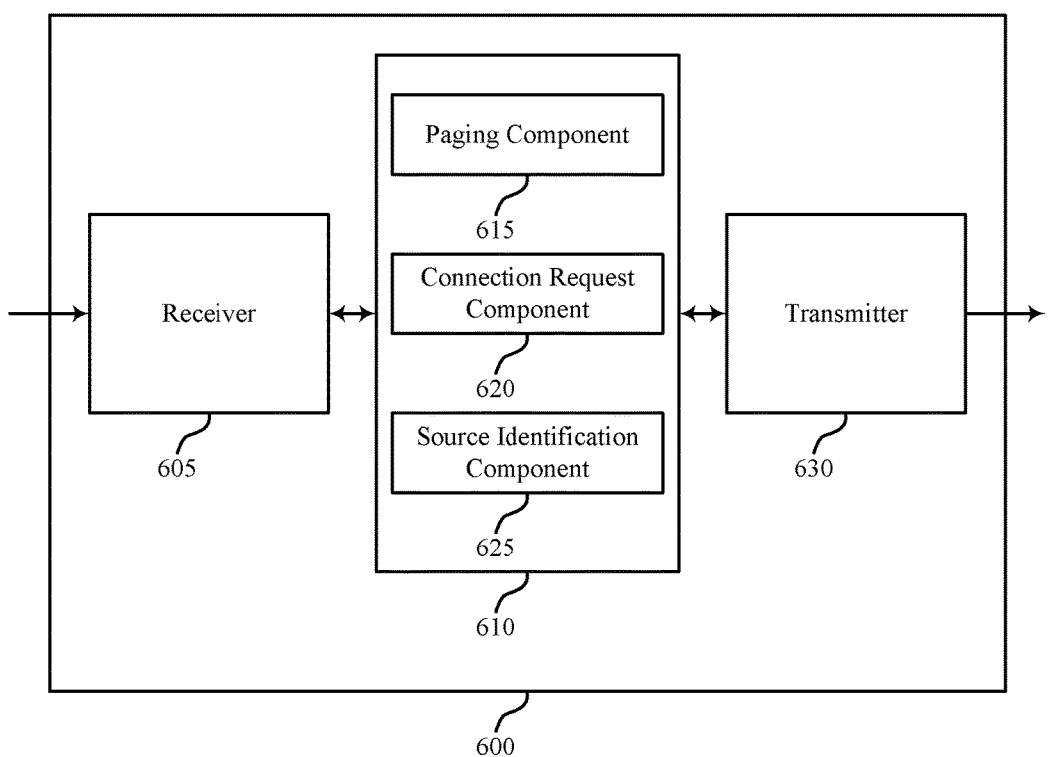

FIG. 6 shows a block diagram of a wireless device 600 that supports secured paging in accordance with various aspects of the present disclosure. Wireless device 600 may be an example of aspects of a wireless device 500 or a UE 115 described with reference to FIGS. 1 through 5. Wireless device 600 may include receiver 605, secured paging manager 610 and transmitter 630. Wireless device 600 may also include a processor. Each of these components may be in communication with each other.

The receiver 605 may receive information which may be passed on to other components of the device 600. The receiver 605 may also perform the functions described with reference to the receiver 505 of FIG. 5. The receiver 605 may be an example of aspects of the transceiver 825 described with reference to FIG. 8.

The secured paging manager 610 may be an example of aspects of secured paging manager 510 described with reference to FIG. 5. The secured paging manager 610 may include paging component 615, connection request component 620 and source identification component 625. The secured paging manager 610 may be an example of aspects of the secured paging manager 805 described with reference to FIG. 8.

The paging component 615 may receive, at the device 600 (e.g., a UE 115), a first paging message including a secured UE identifier calculated based on a security configuration negotiated between the UE 115 and a trusted source. In some cases, the security configuration includes a security key. In some cases, the security key includes a key access security management entity ($K_{asme}$). In some cases, the determining the first paging message is received from the trusted source includes: determining a UE sequence number for the first paging message.

The connection request component 620 may refrain from transmitting the connection request message based on a determination that the UE sequence number has been previously used, transmit a connection request message based on the determination that the first paging message is received from a trusted source, and refrain from transmitting the connection request message based on a determination that the first paging message is received from the untrusted source.

The source identification component 625 may determine whether the first paging message is received from the trusted source or an untrusted source based on the secured UE identifier. In some cases, the determining the first paging message is received from the trusted source includes: determining that the first paging message includes the secured UE identifier.

The transmitter 630 may transmit signals received from other components of wireless device 600. In some examples, the transmitter 630 may be collocated with a receiver in a transceiver. For example, the transmitter 630 may be an example of aspects of the transceiver 825 described with reference to FIG. 8. The transmitter 630 may utilize a single antenna, or it may utilize a plurality of antennas.

Figure 7:
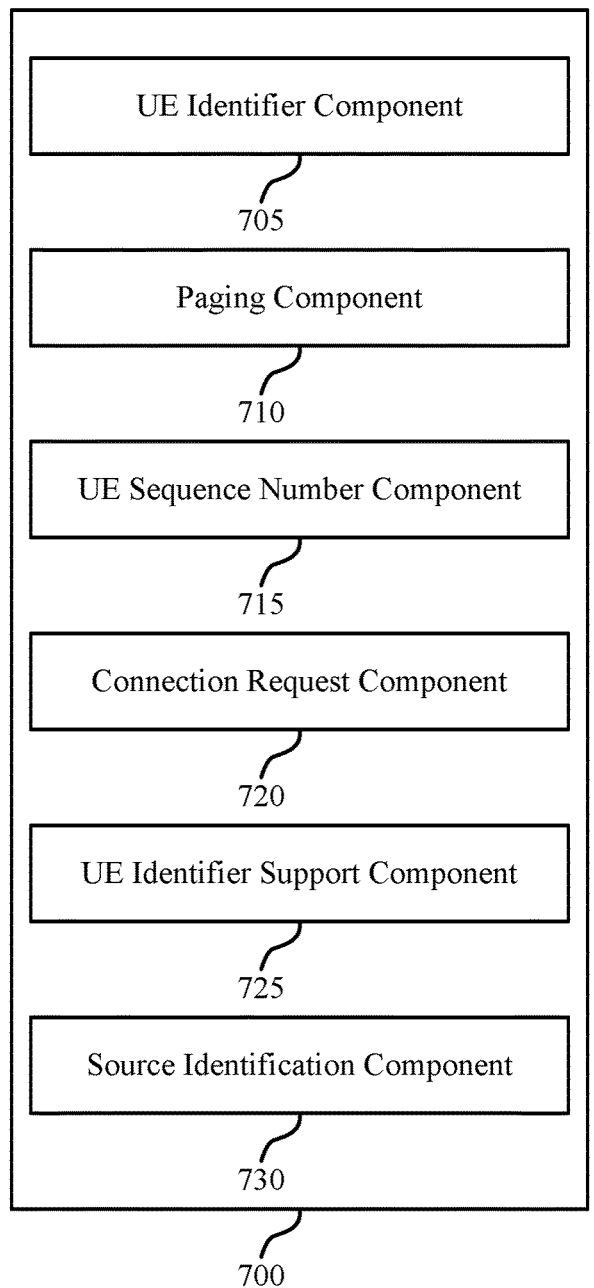

FIG. 7 shows a block diagram of a secured paging manager 700 which may be an example of the corresponding component of wireless device 500 or wireless device 600. That is, secured paging manager 700 may be an example of aspects of secured paging manager 510 or secured paging manager 610 described with reference to FIGS. 5 and 6, respectively. The secured paging manager 700 may also be an example of aspects of the secured paging manager 805 described with reference to FIG. 8.

The secured paging manager 700 may include UE identifier component 705, paging component 710, UE sequence number component 715, connection request component 720, UE identifier support component 725 and source identification component 730. Each of these components may communicate, directly or indirectly, with one another (e.g., via one or more buses).

The UE identifier component 705 may calculate one or more expected secured UE identifiers based on the security configuration, and determine that the first paging message includes the secured UE identifier that matches at least one of the one or more expected secured UE identifiers. In some cases, the security configuration includes a sequence number. In some cases, the secured UE identifier includes at least a portion of the sequence number. In some cases, the sequence number includes at least a portion of a DL non-access stratum (NAS) count value.

The paging component 710 may receive a first paging message including a secured UE identifier calculated based on a security configuration negotiated between the UE and a trusted source. The UE sequence number component 715 may determine that the UE sequence number has not been previously used.

The connection request component 720 may refrain from transmitting the connection request message based on a determination that the UE sequence number has been previously used, transmit a connection request message based on the determination that the first paging message is received from a trusted source, and refrain from transmitting the connection request message based on a determination that the first paging message is received from the untrusted source.

The UE identifier support component 725 may transmit a support indicator to the trusted source, the support indicator providing an indication that the UE 115 supports the use of the secured UE identifier in a paging procedure, and receive, from the trusted source, a confirmation that the trusted source supports the use of the secured UE identifier in the paging procedure. In some cases, the confirmation includes a format indicator associated with the secured UE identifier.

The source identification component 730 may determine whether the first paging message is received from the trusted source or an untrusted source based on the secured UE identifier. In some cases, the determining the first paging message is received from the trusted source includes: determining that the first paging message includes the secured UE identifier.

Figure 8:
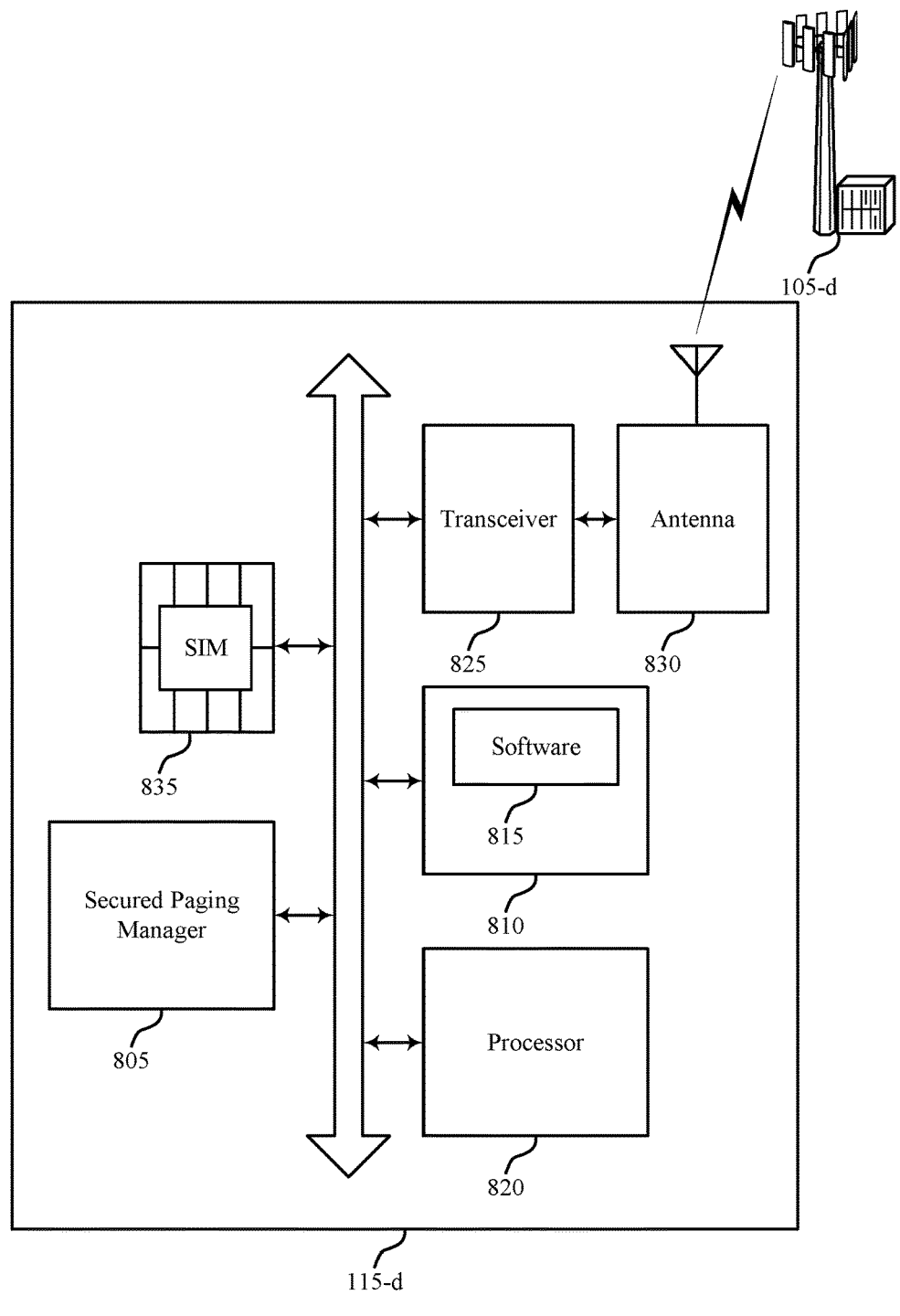
FIG. 8 illustrates a block diagram of a system including a UE that supports secured paging in accordance with aspects of the present disclosure.

FIG. 8 shows a diagram of a system 800 including a device that supports secured paging in accordance with various aspects of the present disclosure. For example, system 800 may include UE 115-d, which may be an example of a wireless device 500, a wireless device 600, or a UE 115 as described with reference to FIGS. 1 through 7.

UE 115-d may also include secured paging manager 805, memory 810, processor 820, transceiver 825, antenna 830 and SIM 835. Each of these modules may communicate, directly or indirectly, with one another (e.g., via one or more buses). The secured paging manager 805 may be an example of a secured paging manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., secured paging, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The SIM 835 may be an integrated circuit (IC) that securely stores the international mobile subscriber identity (IMSI) and the related key used to identify and authenticate UE 115-d as described above. SIM 835 may also contain a unique serial number (e.g., an IC card identification (ID) (ICCID)), security authentication and ciphering information, temporary information related to the local network, a list of the services, a personal ID number (PIN), and a personal unblocking code (PUK) for PIN unlocking. In some cases, SIM 835 may be a circuit embedded in a removable plastic card.

Figure 9:
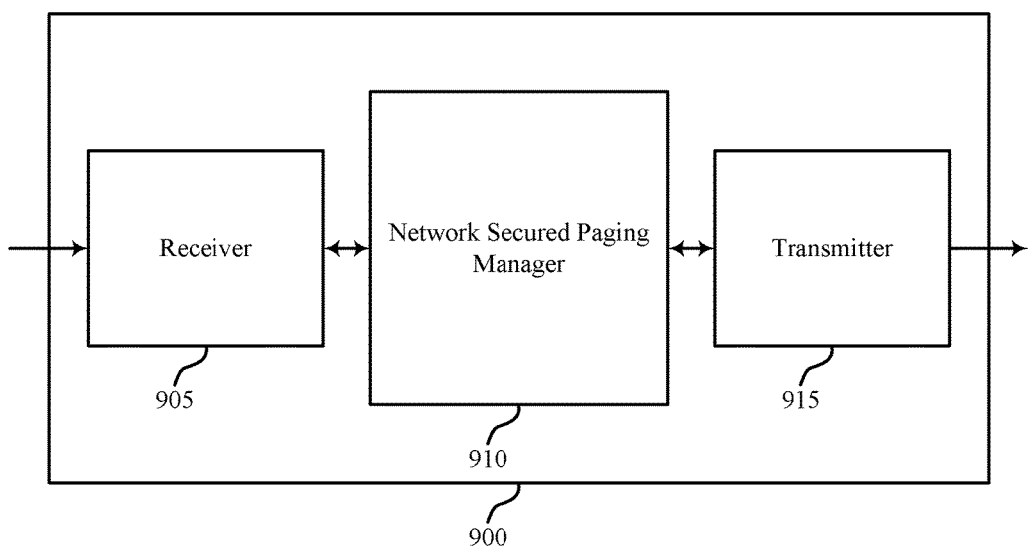
FIGS. 9 through 11 show block diagrams of a wireless device that supports secured paging in accordance with aspects of the present disclosure.

FIG. 9 shows a block diagram of a wireless device 900 that supports secured paging in accordance with various aspects of the present disclosure. Wireless device 900 may be an example of aspects of an core network 130 (also referred to as MME 130) described with reference to FIGS. 1 through 4. Wireless device 900 may include receiver 905, network secured paging manager 910 and transmitter 915. Wireless device 900 may also include a processor. Each of these components may be in communication with each other.

The receiver 905 may receive information such as packets, user data, or control information associated with various information channels (e.g., control channels, data channels, and information related to secured paging, etc.). Information may be passed on to other components of the device. The receiver 905 may be an example of aspects of the transceiver 1225 described with reference to FIG. 12.

The network secured paging manager 910 may determine a secured UE identifier calculated based on a security configuration negotiated between the UE and a wireless device 900 (e.g., a trusted source), transmit a first paging message to the UE, the first paging message including the secured UE identifier, and establish a connection with the UE. The network secured paging manager 910 may also be an example of aspects of the network secured paging manager 1205 described with reference to FIG. 12.

The transmitter 915 may transmit signals received from other components of wireless device 900. In some examples, the transmitter 915 may be collocated with a receiver in a transceiver. For example, the transmitter 915 may be an example of aspects of the transceiver 1225 described with reference to FIG. 12. The transmitter 915 may include a single antenna, or it may include a plurality of antennas.

Figure 10:
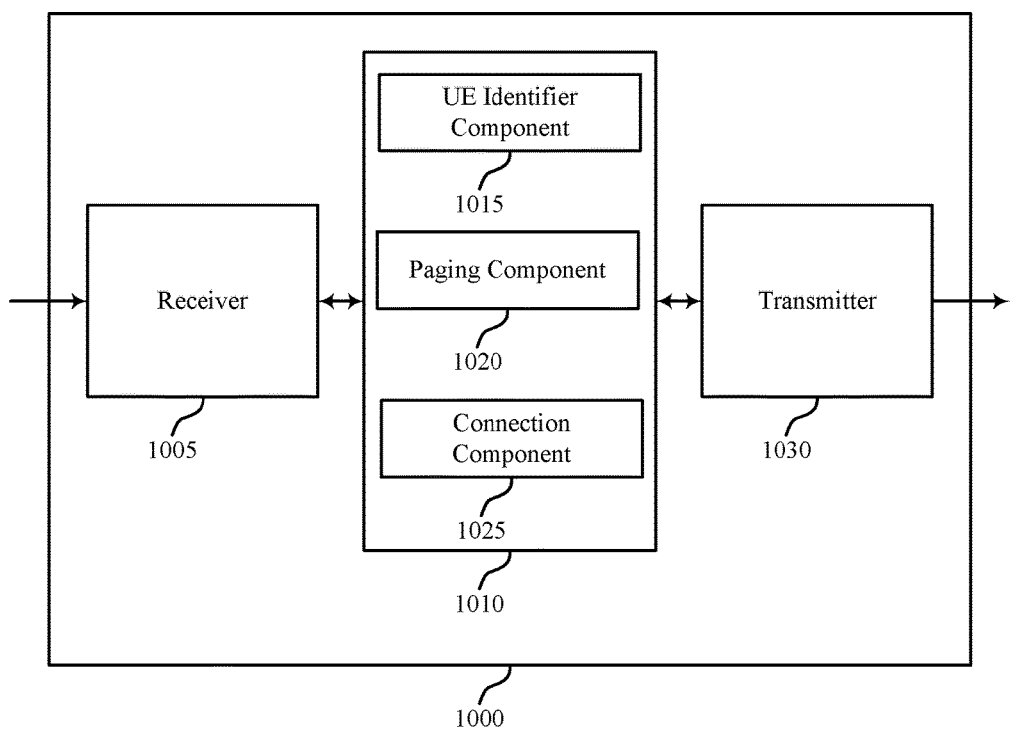

FIG. 10 shows a block diagram of a wireless device 1000 that supports secured paging in accordance with various aspects of the present disclosure. Wireless device 1000 may be an example of aspects of a wireless device 900 or an MME 130 described with reference to FIGS. 1 through 4 and 9. Wireless device 1000 may include receiver 1005, network secured paging manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The network secured paging manager 1010 may be an example of aspects of network secured paging manager 910 described with reference to FIG. 9. The network secured paging manager 1010 may include UE identifier component 1015, paging component 1020 and connection component 1025. The network secured paging manager 1010 may be an example of aspects of the network secured paging manager 1205 described with reference to FIG. 12.

The UE identifier component 1015 may determine a secured UE identifier calculated based on a security configuration negotiated between the UE 115 and a trusted source. In some cases, the security configuration includes a security key. In some cases, the security key includes a key access security management entity ($K_{asme}$). In some cases, the security configuration includes a sequence number. In some cases, the secured UE identifier includes at least a portion of the sequence number. In some cases, the sequence number is based on a DL non-access stratum (NAS) count value.

The paging component 1020 may transmit a first paging message to the UE 115, the first paging message including the secured UE identifier. The connection component 1025 may establish a connection with the UE.

The transmitter 1030 may transmit signals received from other components of wireless device 1000. In some examples, the transmitter 1030 may be collocated with a receiver in a transceiver. For example, the transmitter 1030 may be an example of aspects of the transceiver 1225 described with reference to FIG. 12. The transmitter 1030 may utilize a single antenna, or it may utilize a plurality of antennas.

Figure 11:
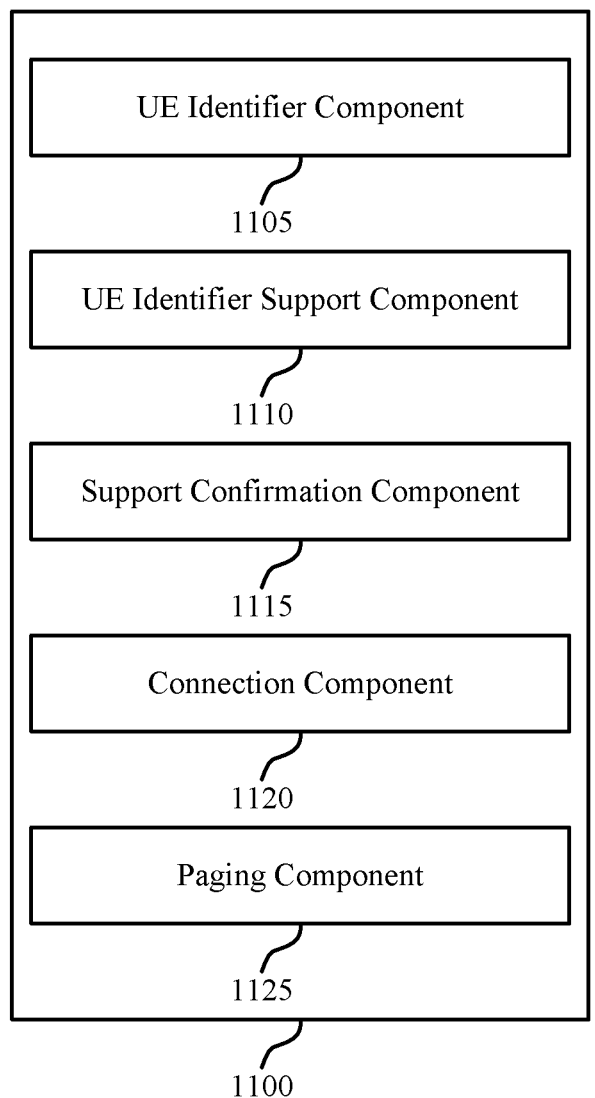

FIG. 11 shows a block diagram of a network secured paging manager 1100 which may be an example of the corresponding component of wireless device 900 or wireless device 1000. That is, network secured paging manager 1100 may be an example of aspects of network secured paging manager 910 or network secured paging manager 1010 described with reference to FIGS. 9 and 10, respectively. The network secured paging manager 1100 may also be an example of aspects of the network secured paging manager 1205 described with reference to FIG. 12.

The network secured paging manager 1100 may include UE identifier component 1105, UE identifier support component 1110, support confirmation component 1115, connection component 1120 and paging component 1125. Each of these components may communicate, directly or indirectly, with one another (e.g., via one or more buses).

The UE identifier component 1105 may determine a secured UE identifier calculated based on a security configuration negotiated between the UE 115 and a trusted source. The UE identifier support component 1110 may receive a support indicator from the UE, the support indicator providing an indication that the UE supports the use of the secured UE identifier in a paging procedure.

The support confirmation component 1115 may transmit, to the UE 115, a confirmation that the trusted source supports the use of the secured UE identifier in the paging procedure. In some cases, the confirmation includes a format indicator associated with the secured UE identifier.

The connection component 1120 may establish a connection with the UE 115. The paging component 1125 may transmit a first paging message to the UE 115, the first paging message including the secured UE identifier.

Figure 12:
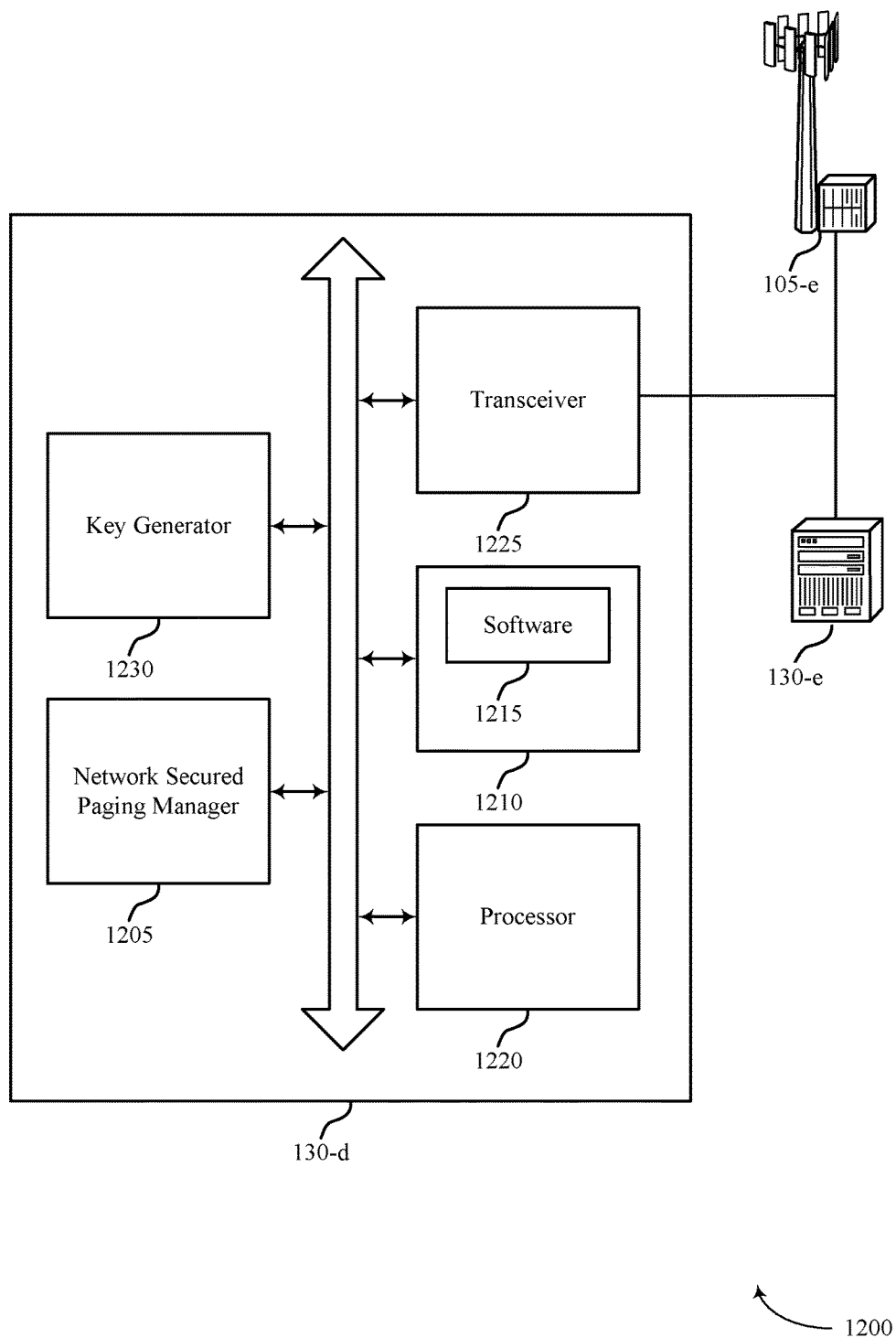
FIG. 12 illustrates a block diagram of a system including a device that supports secured paging in accordance with aspects of the present disclosure.

FIG. 12 shows a diagram of a system 1200 including a device that supports secured paging in accordance with various aspects of the present disclosure. For example, system 1200 may include MME 130-d, which may be an example of a wireless device 900, a wireless device 1000, or a MME 130 as described with reference to FIGS. 1 through 4 and 9 through 11.

MME 130-d may also include network secured paging manager 1205, memory 1210, processor 1220, transceiver 1225 and key generator 1230. Each of these components may communicate, directly or indirectly, with one another (e.g., via one or more buses). The network secured paging manager 1205 may be an example of a network secured paging manager as described with reference to FIGS. 9 through 11.

The memory 1210 may include RAM and ROM. The memory 1210 may store computer-readable, computer-executable software including instructions that, when executed, cause the processor to perform various functions described herein (e.g., secured paging, etc.). In some cases, the software 1215 may not be directly executable by the processor but may cause a computer (e.g., when compiled and executed) to perform functions described herein.

The processor 1220 may include an intelligent hardware device, (e.g., a CPU, a microcontroller, an ASIC, etc.) The transceiver 1225 may communicate bi-directionally, via one or more antennas, wired, or wireless links, with one or more networks, as described above. For example, the transceiver 1225 may communicate bi-directionally with a base station 105, another MME 130, and/or a UE 115. The transceiver 1225 may also include a modem to modulate the packets and provide the modulated packets to the antennas for transmission, and to demodulate packets received from the antennas.

The key generator 1230 may generate one or more security keys (e.g., the $K_{asme}$) as described herein.

Figure 13:
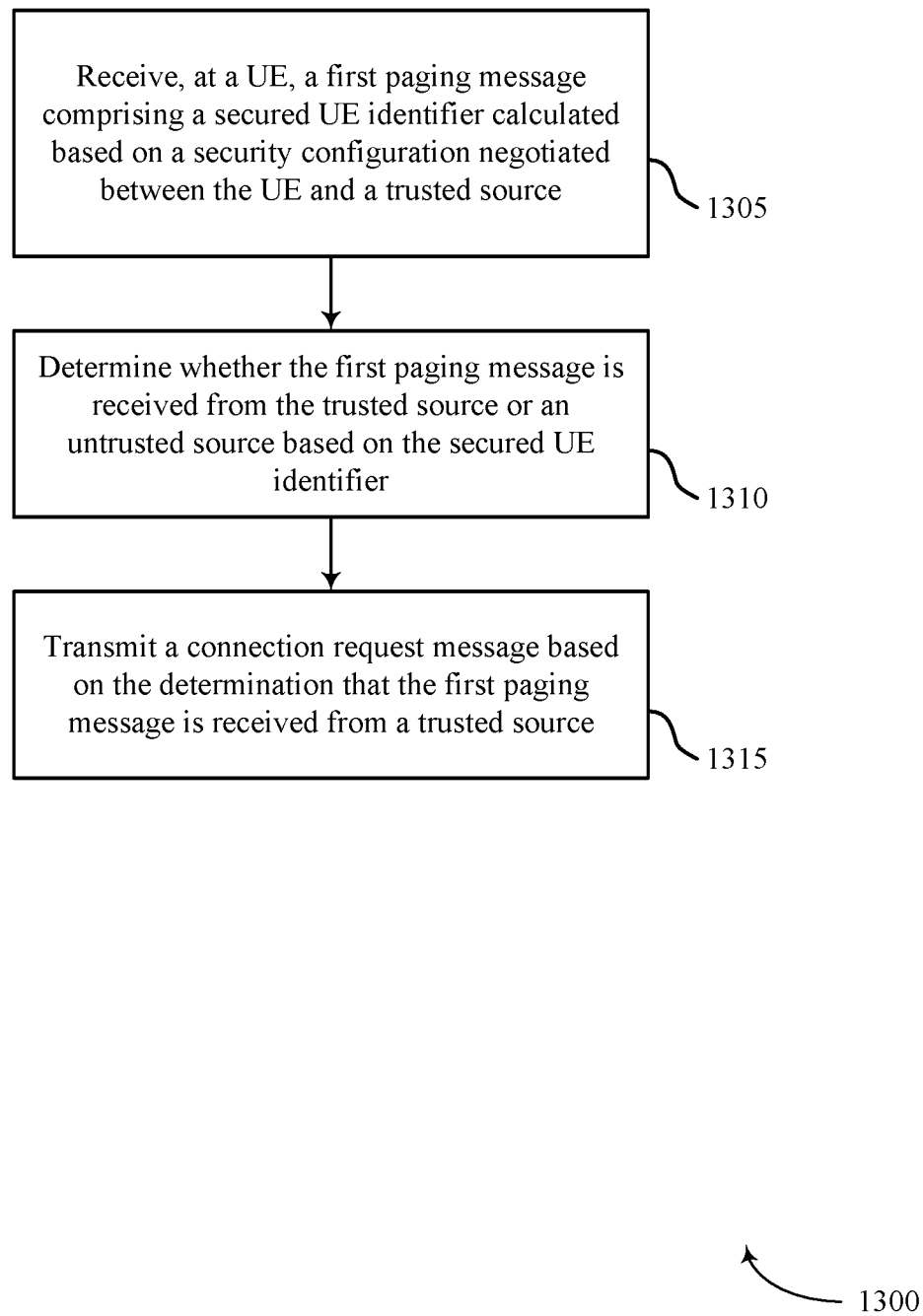
FIGS. 13 through 18 illustrate methods for secured paging in accordance with aspects of the present disclosure.

FIG. 13 shows a flowchart illustrating a method 1300 for secured paging in accordance with various aspects of the present disclosure. The operations of method 1300 may be implemented by a device such as a UE 115 or its components as described with reference to FIGS. 1 through 4 and 8 and/or a wireless device described with reference to FIGS. 5 through 7. For example, the operations of method 1300 may be performed by the secured paging manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive a first paging message including a secured UE identifier calculated based on a security configuration negotiated between the UE 115 and a trusted source as described above with reference to FIGS. 2 through 4. In certain examples, the operations of block 1305 may be performed by the paging component as described with reference to FIGS. 6 and 7.

At block 1310, the UE 115 may determine whether the first paging message is received from the trusted source or an untrusted source based on the secured UE identifier as described above with reference to FIGS. 2 through 4. In certain examples, the operations of block 1310 may be performed by the source identification component as described with reference to FIGS. 6 and 7.

At block 1315, the UE 115 may transmit a connection request message based on the determination that the first paging message is received from a trusted source as described above with reference to FIGS. 2 through 4. In certain examples, the operations of block 1315 may be performed by the connection request component as described with reference to FIGS. 6 and 7.

Figure 14:
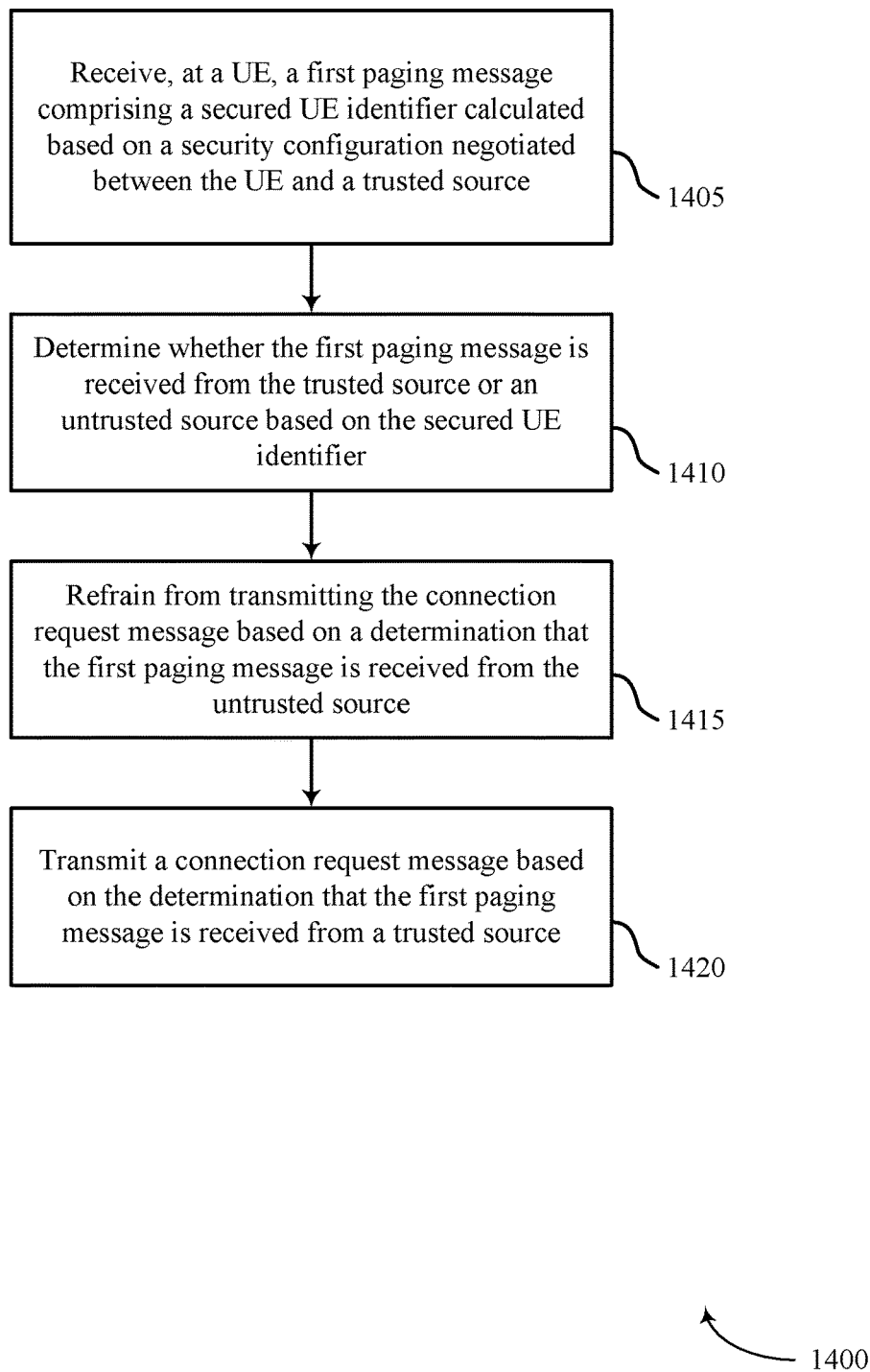

FIG. 14 shows a flowchart illustrating a method 1400 for secured paging in accordance with various aspects of the present disclosure. The operations of method 1400 may be implemented by a device such as a UE 115 or its components as described with reference to FIGS. 1 through 4 and 8 and/or a wireless device described with reference to FIGS. 5 through 7. For example, the operations of method 1400 may be performed by the secured paging manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a first paging message including a secured UE identifier calculated based on a security configuration negotiated between the UE 115 and a trusted source as described above with reference to FIGS. 2 through 4. In certain examples, the operations of block 1405 may be performed by the paging component as described with reference to FIGS. 6 and 7.

At block 1410, the UE 115 may determine whether the first paging message is received from the trusted source or an untrusted source based on the secured UE identifier as described above with reference to FIGS. 2 through 4. In certain examples, the operations of block 1410 may be performed by the source identification component as described with reference to FIGS. 6 and 7.

At block 1415, the UE 115 may refrain from transmitting the connection request message based on a determination that the first paging message is received from the untrusted source as described above with reference to FIGS. 2 through 4. In certain examples, the operations of block 1415 may be performed by the connection request component as described with reference to FIGS. 6 and 7.

At block 1420, the UE 115 may transmit a connection request message based on the determination that the first paging message is received from a trusted source as described above with reference to FIGS. 2 through 4. In certain examples, the operations of block 1420 may be performed by the connection request component as described with reference to FIGS. 6 and 7.

Figure 15:
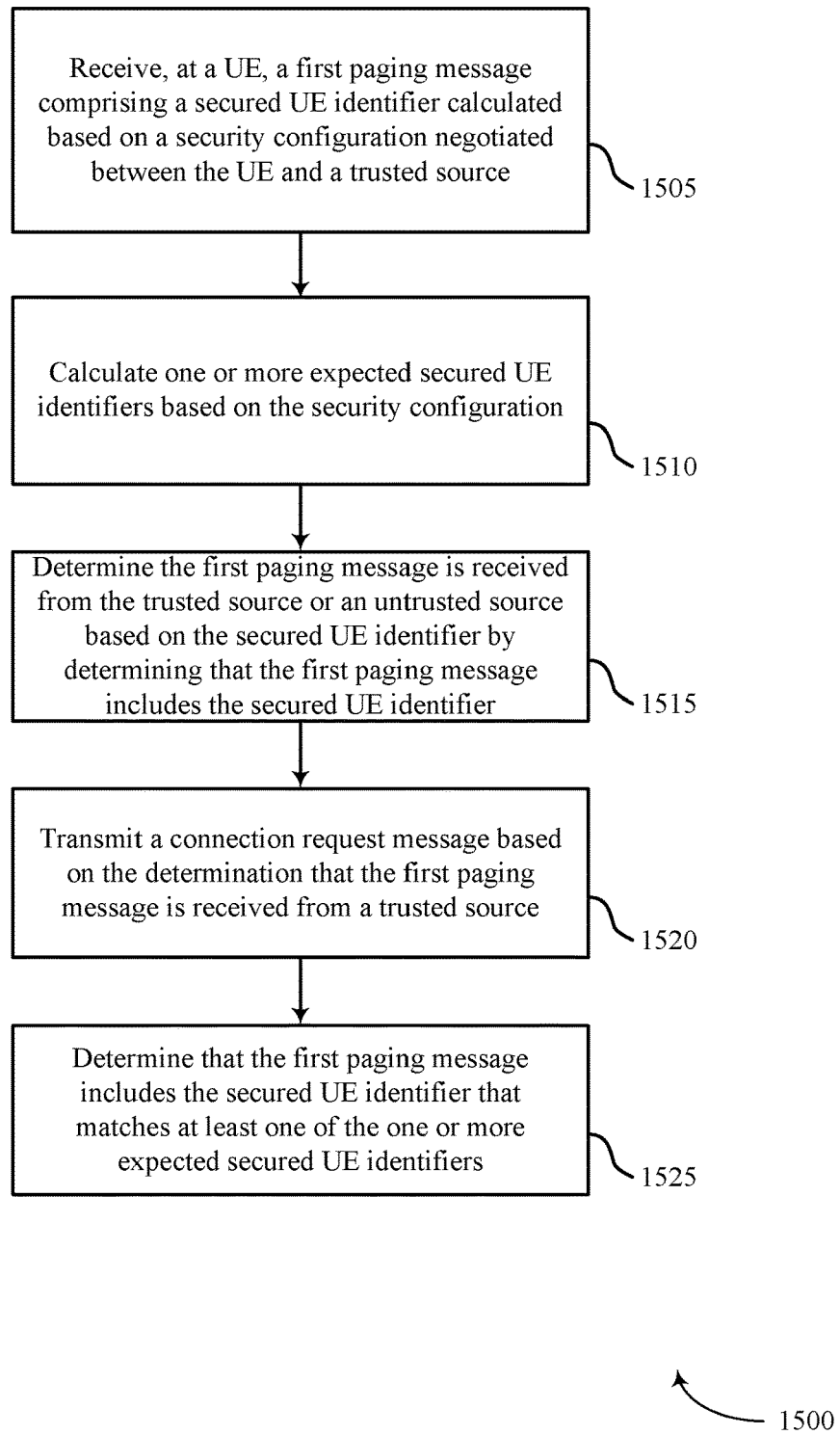

FIG. 15 shows a flowchart illustrating a method 1500 for secured paging in accordance with various aspects of the present disclosure. The operations of method 1500 may be implemented by a device such as a UE 115 or its components as described with reference to FIGS. 1 through 4 and 8 and/or a wireless device described with reference to FIGS. 5 through 7. For example, the operations of method 1500 may be performed by the secured paging manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a first paging message including a secured UE identifier calculated based on a security configuration negotiated between the UE 115 and a trusted source as described above with reference to FIGS. 2 through 4. In certain examples, the operations of block 1505 may be performed by the paging component as described with reference to FIGS. 6 and 7.

At block 1510, the UE 115 may calculate one or more expected secured UE identifiers based on the security configuration as described above with reference to FIGS. 2 through 4. In certain examples, the operations of block 1510 may be performed by the UE identifier component as described with reference to FIGS. 6 and 7.

At block 1515, the UE 115 may determine whether the first paging message is received from the trusted source or an untrusted source based on the secured UE identifier as described above with reference to FIGS. 2 through 4. In some cases, the determining the first paging message is received from the trusted source includes: determining that the first paging message includes the secured UE identifier. In certain examples, the operations of block 1515 may be performed by the source identification component as described with reference to FIGS. 6 and 7.

At block 1520, the UE 115 may transmit a connection request message based on the determination that the first paging message is received from a trusted source as described above with reference to FIGS. 2 through 4. In certain examples, the operations of block 1520 may be performed by the connection request component as described with reference to FIGS. 6 and 7.

At block 1525, the UE 115 may determine that the first paging message includes the secured UE identifier that matches at least one of the one or more expected secured UE identifiers as described above with reference to FIGS. 2 through 4. In certain examples, the operations of block 1525 may be performed by the UE identifier component as described with reference to FIGS. 6 and 7.

Figure 16:
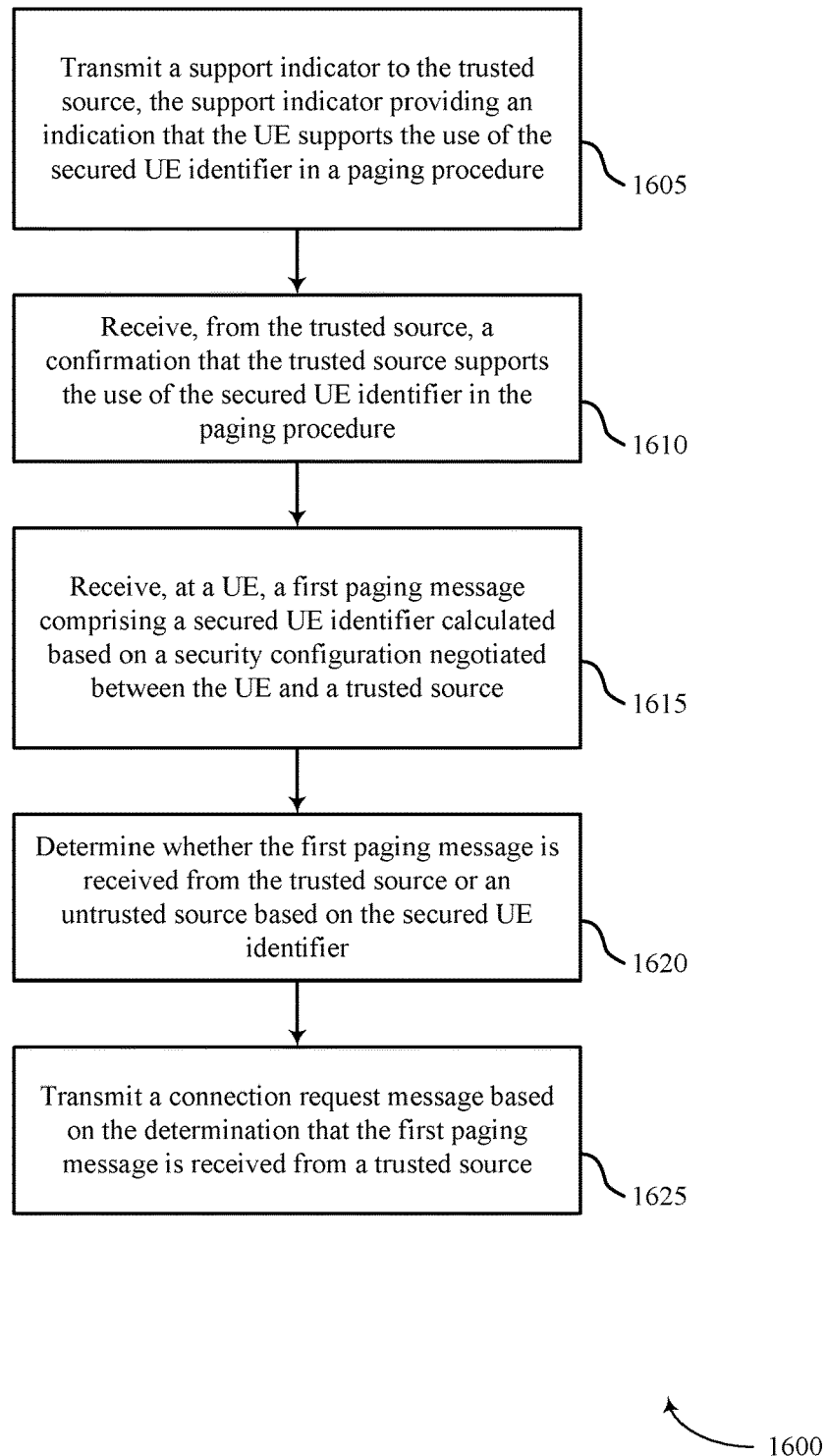

FIG. 16 shows a flowchart illustrating a method 1600 for secured paging in accordance with various aspects of the present disclosure. The operations of method 1600 may be implemented by a device such as a UE 115 or its components as described with reference to FIGS. 1 through 4 and 8 and/or a wireless device described with reference to FIGS. 5 through 7. For example, the operations of method 1600 may be performed by the secured paging manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may transmit a support indicator to the trusted source, the support indicator providing an indication that the UE supports the use of the secured UE identifier in a paging procedure as described above with reference to FIGS. 2 through 4. In certain examples, the operations of block 1605 may be performed by the UE identifier support component as described with reference to FIGS. 6 and 7.

At block 1610, the UE 115 may receive, from the trusted source, a confirmation that the trusted source supports the use of the secured UE identifier in the paging procedure as described above with reference to FIGS. 2 through 4. In certain examples, the operations of block 1610 may be performed by the UE identifier support component as described with reference to FIGS. 6 and 7.

At block 1615, the UE 115 may receive a first paging message including a secured UE identifier calculated based on a security configuration negotiated between the UE 115 and a trusted source as described above with reference to FIGS. 2 through 4. In certain examples, the operations of block 1615 may be performed by the paging component as described with reference to FIGS. 6 and 7.

At block 1620, the UE 115 may determine whether the first paging message is received from the trusted source or an untrusted source based on the secured UE identifier as described above with reference to FIGS. 2 through 4. In certain examples, the operations of block 1620 may be performed by the source identification component as described with reference to FIGS. 6 and 7.

At block 1625, the UE 115 may transmit a connection request message based on the determination that the first paging message is received from a trusted source as described above with reference to FIGS. 2 through 4. In certain examples, the operations of block 1625 may be performed by the connection request component as described with reference to FIGS. 6 and 7.

Figure 17:
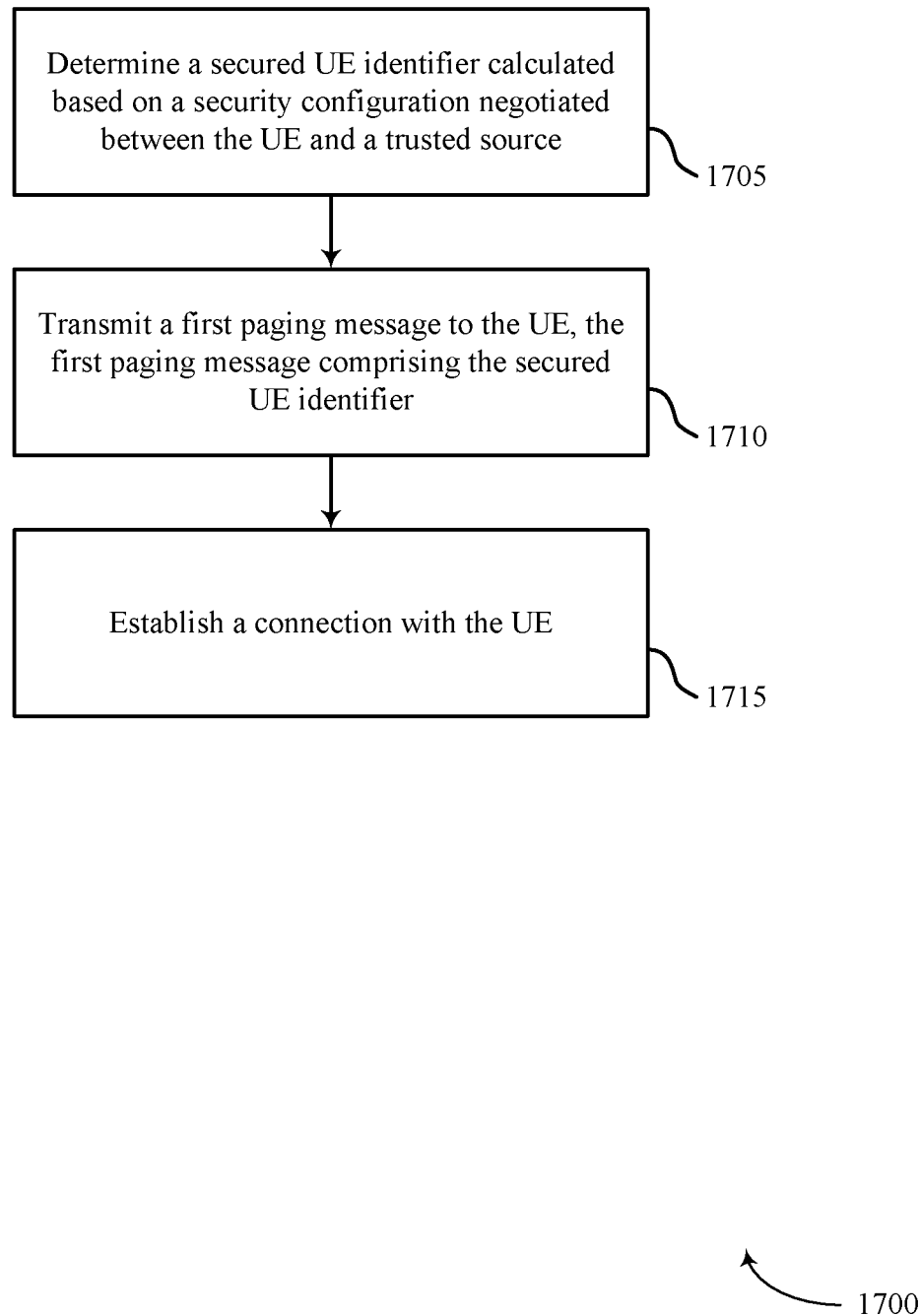

FIG. 17 shows a flowchart illustrating a method 1700 for secured paging in accordance with various aspects of the present disclosure. The operations of method 1700 may be implemented by a device such as an MME 130 or its components as described with reference to FIGS. 1 through 4 and 12 and/or by a wireless device described with reference to FIGS. 9 through 11. For example, the operations of method 1700 may be performed by the network secured paging manager as described herein. In some examples, the MME 130 may execute a set of codes to control the functional elements of the device to perform the functions described below. Additionally or alternatively, the MME 130 may perform aspects the functions described below using special-purpose hardware.

At block 1705, the MME 130 may determine a secured UE identifier calculated based on a security configuration negotiated between the UE 115 and a trusted source as described above with reference to FIGS. 2 through 4. In certain examples, the operations of block 1705 may be performed by the UE identifier component as described with reference to FIGS. 10 and 11.

At block 1710, the MME 130 may transmit a first paging message to the UE 115, the first paging message including the secured UE identifier as described above with reference to FIGS. 2 through 4. In certain examples, the operations of block 1710 may be performed by the paging component as described with reference to FIGS. 10 and 11.

At block 1715, the MME 130 may establish a connection with the UE as described above with reference to FIGS. 2 through 4. In certain examples, the operations of block 1715 may be performed by the connection component as described with reference to FIGS. 10 and 11.

Figure 18:
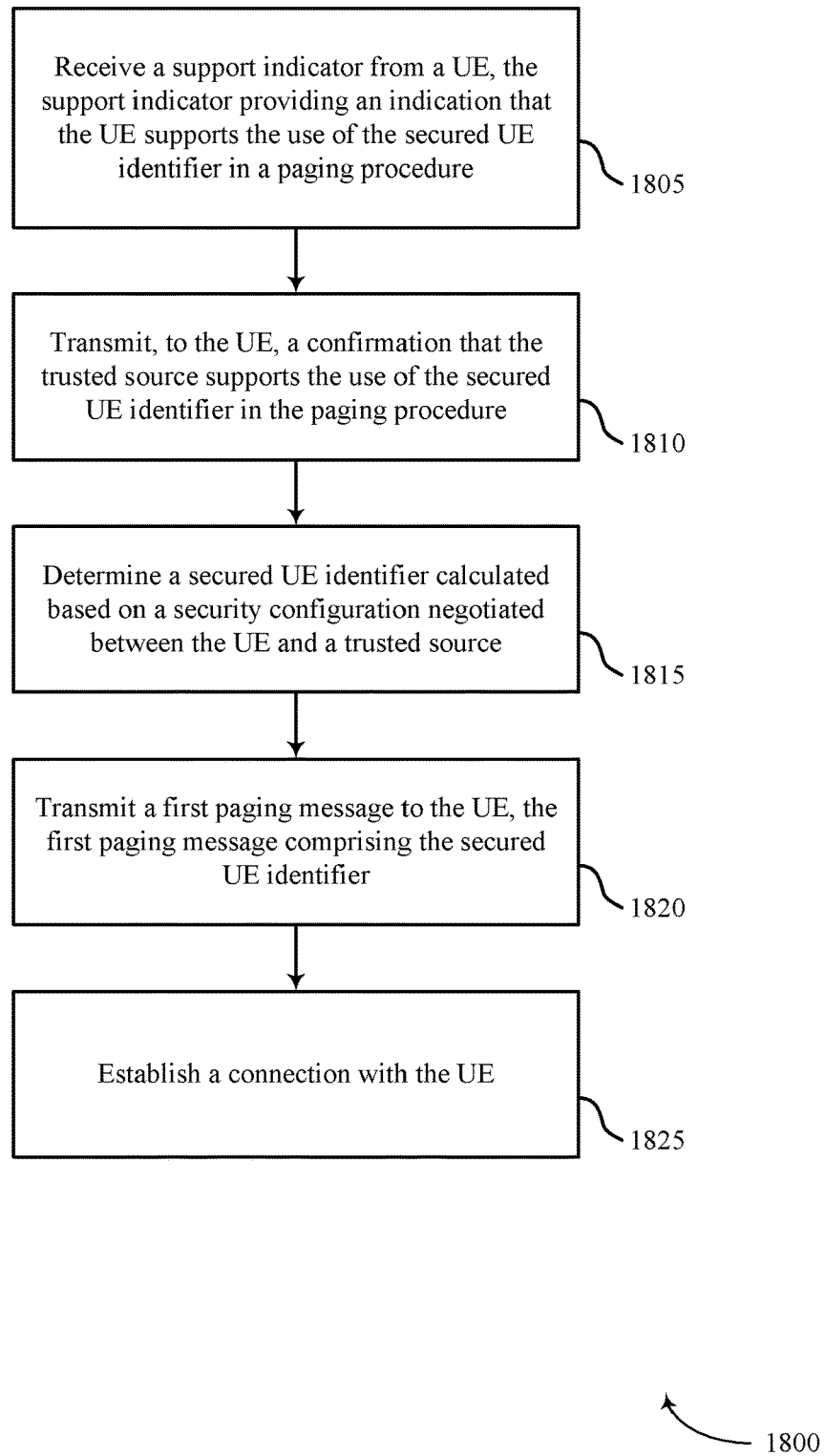

FIG. 18 shows a flowchart illustrating a method 1800 for secured paging in accordance with various aspects of the present disclosure. The operations of method 1800 may be implemented by a device such as an MME 130 or its components as described with reference to FIGS. 1 through 4 and 12 and/or by a wireless device described with reference to FIGS. 9 through 11. For example, the operations of method 1800 may be performed by the network secured paging manager as described herein. In some examples, the MME 130 may execute a set of codes to control the functional elements of the device to perform the functions described below. Additionally or alternatively, the MME 130 may perform aspects the functions described below using special-purpose hardware.

At block 1805, the MME 130 may receive a support indicator from the UE 115, the support indicator providing an indication that the UE 115 supports the use of the secured UE identifier in a paging procedure as described above with reference to FIGS. 2 through 4. In certain examples, the operations of block 1805 may be performed by the UE identifier support component as described with reference to FIGS. 10 and 11.

At block 1810, the MME 130 may transmit, to the UE 115, a confirmation that the trusted source supports the use of the secured UE identifier in the paging procedure as described above with reference to FIGS. 2 through 4. In certain examples, the operations of block 1810 may be performed by the support confirmation component as described with reference to FIGS. 10 and 11.

At block 1815, the MME 130 may determine a secured UE identifier calculated based on a security configuration negotiated between the UE and a trusted source as described above with reference to FIGS. 2 through 4. In certain examples, the operations of block 1815 may be performed by the UE identifier component as described with reference to FIGS. 10 and 11.

At block 1820, the MME 130 may transmit a first paging message to the UE 115, the first paging message including the secured UE identifier as described above with reference to FIGS. 2 through 4. In certain examples, the operations of block 1820 may be performed by the paging component as described with reference to FIGS. 10 and 11.

At block 1825, the MME 130 may establish a connection with the UE 115 as described above with reference to FIGS. 2 through 4. In certain examples, the operations of block 1825 may be performed by the connection component as described with reference to FIGS. 10 and 11.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for secured paging.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for secured paging. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one IC. In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
negotiating, at a user equipment (UE), a security configuration between the UE and a trusted source, wherein the security configuration comprises a secured UE identifier and a number of bits in a sequence number associated with the secured UE identifier;
receiving, at the UE, a first paging message comprising a candidate secured UE identifier; and
determining, at the UE, whether the first paging message is received from the trusted source or an untrusted source based at least in part on the candidate secured UE identifier, the number of bits, and the security configuration.

2. The method of claim 1, further comprising:
refraining from transmitting a connection request message based at least in part on a determination that the first paging message is received from the untrusted source.

3. The method of claim 1, wherein determining whether the first paging message is received from the trusted source or the untrusted source comprises:
determining that the first paging message is received from the trusted source based at least in part on the security configuration and the candidate secured UE identifier; and
transmitting a connection request message to a base station based at least in part on the determination that the first paging message is received from the trusted source.

4. The method of claim 3, further comprising:
calculating one or more expected secured UE identifiers based at least in part on the security configuration; and
determining that the candidate secured UE identifier matches at least one of the one or more expected secured UE identifiers.

5. The method of claim 1, wherein the security configuration comprises a security key.

6. The method of claim 5, wherein the security key comprises a key access security management entity (Kasme).

7. The method of claim 1, wherein the secured UE identifier comprises at least a portion of the sequence number.

8. The method of claim 7, wherein the sequence number comprises at least a portion of a downlink (DL) non-access stratum (NAS) count value.

9. The method of claim 1, wherein determining whether the first paging message is received from the trusted source or the untrusted source comprises:
determining a first UE sequence number;
identifying a second UE sequence number included in the candidate secured UE identifier;
determining that the second UE sequence number has not been previously used; and
determining the first paging message is received from the trusted source based at least in part on the first UE sequence number matching the second UE sequence number.

10. The method of claim 1, wherein determining whether the first paging message is received from the trusted source or the untrusted source comprises:
- determining a first UE sequence number for the first paging message;
- identifying a second UE sequence number included in the candidate secured UE identifier;
- determining that the second UE sequence number has been previously used;
- determining the first paging message is received from the untrusted source; and
- refraining from transmitting a connection request message based at least in part on the determination that the second UE sequence number has been previously used.

11. The method of claim 1, further comprising:
- transmitting a support indicator to the trusted source, the support indicator providing an indication that the UE supports the use of the secured UE identifier in a paging procedure.

12. The method of claim 11, further comprising:
- receiving, from the trusted source, a confirmation that the trusted source supports the use of the secured UE identifier in the paging procedure.

13. The method of claim 12, wherein the confirmation comprises a format indicator associated with the secured UE identifier.

14. An apparatus for wireless communication comprising:
- means for negotiating a security configuration between a user equipment (UE) and a trusted source, wherein the security configuration comprises a secured UE identifier and a number of bits in a sequence number associated with the secured UE identifier;
- means for receiving, a first paging message comprising a candidate secured UE identifier; and
- means for determining whether the first paging message is received from the trusted source or an untrusted source based at least in part on the candidate secured UE identifier, the number of bits, and the security configuration.

15. The apparatus of claim 14, further comprising:
- means for refraining from transmitting a connection request message based at least in part on a determination that the first paging message is received from the untrusted source.

16. The apparatus of claim 14, wherein the means for determining whether the first paging message is received from the trusted source or the untrusted source comprises:
- means for determining that the first paging message is received from the trusted source based at least in part on the security configuration and the candidate secured UE identifier; and
- means for transmitting a connection request message to a base station based at least in part on the determination that the first paging message is received from the trusted source.

17. The apparatus of claim 16, further comprising:
- means for calculating one or more expected secured UE identifiers based at least in part on the security configuration; and
- means for determining that the candidate secured UE identifier matches at least one of the one or more expected secured UE identifiers.

18. The apparatus of claim 14, wherein the security configuration comprises a security key.

19. The apparatus of claim 18, wherein the security key comprises a key access security management entity (Kasme).

20. An apparatus for wireless communication, comprising:
- a processor;
- memory in electronic communication with the processor; and
- instructions stored in the memory and operable, when executed by the processor, to cause the apparatus to:
  - negotiate a security configuration between a user equipment (UE) and a trusted source, wherein the security configuration comprises a secured UE identifier and a number of bits in a sequence number associated with the secured UE identifier;
  - receive a first paging message comprising a candidate secured UE identifier; and
  - determine whether the first paging message is received from the trusted source or an untrusted source based at least in part on the candidate secured UE identifier, the number of bits, and the security configuration.

21. The apparatus of claim 20, wherein the instructions are operable to cause the processor to:
- refrain from transmitting a connection request message based at least in part on a determination that the first paging message is received from the untrusted source.

22. The apparatus of claim 20, wherein determining whether the first paging message is received from the trusted source or the untrusted source comprises:
- determining that the first paging message is received from the trusted source based at least in part on the security configuration and the candidate secured UE identifier; and
- transmitting a connection request message to a base station based at least in part on the determination that the first paging message is received from the trusted source.

23. The apparatus of claim 22, wherein the instructions are operable to cause the processor to:
- calculate one or more expected secured UE identifiers based at least in part on the security configuration; and
- determine that the candidate secured UE identifier matches at least one of the one or more expected secured UE identifiers.

24. The apparatus of claim 20, wherein the security configuration comprises a security key.

25. The apparatus of claim 24, wherein the security key comprises a key access security management entity (Kasme).

26. The apparatus of claim 20, wherein the secured UE identifier comprises at least a portion of the sequence number.

27. The apparatus of claim 26, wherein the sequence number comprises at least a portion of a downlink (DL) non-access stratum (NAS) count value.

28. The apparatus of claim 20, wherein determining whether the first paging message is received from the trusted source or the untrusted source comprises:
- determining a first UE sequence number;
- identifying a second UE sequence number included in the candidate secured UE identifier;
- determining that the second UE sequence number has not been previously used; and
- determining the first paging message is received from the trusted source based at least in part on the first UE sequence number matching the second UE sequence number.

29. The apparatus of claim 20, wherein determining whether the first paging message is received from the trusted source or the untrusted source comprises:

determining a first UE sequence number for the first paging message;

identifying a second UE sequence number included in the candidate secured UE identifier;

determining that the second UE sequence number has been previously used;

determining the first paging message is received from the untrusted source; and refraining from transmitting a connection request message based at least in part on a determination that the second UE sequence number has been previously used.

30. The apparatus of claim 20, wherein the instructions are operable to cause the processor to:

transmit a support indicator to the trusted source, the support indicator providing an indication that the UE supports the use of the secured UE identifier in a paging procedure.

31. The apparatus of claim 30, wherein the instructions are operable to cause the processor to:

receive, from the trusted source, a confirmation that the trusted source supports the use of the secured UE identifier in the paging procedure.

32. The apparatus of claim 31, wherein the confirmation comprises a format indicator associated with the secured UE identifier.

33. A non-transitory computer-readable medium storing code for wireless communication, the code comprising instructions executable to:

negotiate a security configuration between a user equipment (UE) and a trusted source, wherein the security configuration comprises a secured UE identifier and a number of bits in a sequence number associated with the secured UE identifier;

receive a first paging message comprising a candidate secured UE identifier; and determine whether the first paging message is received from the trusted source or an untrusted source based at least in part on the candidate secured UE identifier, the number of bits, and the security configuration.

34. The method of claim 1, further comprising:

calculating a plurality of expected secured UE identifiers based at least in part on the number of bits in the sequence number.

\* \* \* \* \*